US009121779B2

(12) United States Patent
Martin

(10) Patent No.: US 9,121,779 B2
(45) Date of Patent: Sep. 1, 2015

(54) SYSTEM FOR RECORDING INFORMATION ASSOCIATED WITH HAIL STORM EVENT AND DETERMINING STRUCTURE DAMAGE BASED ON SAME

(71) Applicant: Hail Signature Technologies, L.L.C., Stilwell, KS (US)

(72) Inventor: Carl Edwin Martin, Independence, MO (US)

(73) Assignee: Hail Signature Technologies, L.L.C., Stilwell, KS (US)

( * ) Notice: Subject to any disclaimer, the term of this patent is extended or adjusted under 35 U.S.C. 154(b) by 173 days.

(21) Appl. No.: 13/752,046

(22) Filed: Jan. 28, 2013

(65) Prior Publication Data

US 2014/0007703 A1 Jan. 9, 2014

Related U.S. Application Data

(60) Provisional application No. 61/710,544, filed on Oct. 5, 2012, provisional application No. 61/591,590, filed on Jan. 27, 2012.

(51) Int. Cl.
*G01L 1/16* (2006.01)
*G01L 5/00* (2006.01)
*G01W 1/14* (2006.01)
*E04B 7/18* (2006.01)
*F24J 2/46* (2006.01)

(52) U.S. Cl.
CPC ............... *G01L 5/0052* (2013.01); *E04B 7/18* (2013.01); *G01W 1/14* (2013.01); *F24J 2/4638* (2013.01); *G01L 1/16* (2013.01)

(58) Field of Classification Search
CPC .......... G01L 5/0052; G01L 1/16; G01N 3/30; G01M 5/0033; G01M 5/0041; G01M 5/0075
USPC ............ 73/12.01, 12.04, 12.05, 12.06, 12.07, 73/12.09, 12.13, 862.621
See application file for complete search history.

(56) References Cited

U.S. PATENT DOCUMENTS

| 6,769,287 B2 * | 8/2004 | Stewart et al. ............... 73/12.01 |
| 7,886,574 B2 * | 2/2011 | Kaneko ....................... 73/12.05 |
| 7,945,388 B2 * | 5/2011 | Housen et al. .................... 702/3 |

(Continued)

FOREIGN PATENT DOCUMENTS

EP 0222640 A2 5/1987

OTHER PUBLICATIONS

PCT International Search Report and Written Opinion from PCT Application No. PCT/US2013/023484 entitled System for Recording Information Associated With Hail Storm Event and Determining Structure Damage Based on Same (Dated May 15, 2013).

(Continued)

*Primary Examiner* — Lisa Caputo
*Assistant Examiner* — Jonathan Dunlap
(74) *Attorney, Agent, or Firm* — Hovey Williams LLP

(57) ABSTRACT

A hail strike recording device is operable to provide quantifiable information about a hail storm event experienced by a roof. The recording device is operable to be installed on a roof and includes a panel component and a mounting assembly. The panel component presents a hail impact zone to sense one or more hail strikes, with the recording device operable to provide recorded data associated with the sensed one or more hail strikes.

79 Claims, 10 Drawing Sheets

(56) References Cited

U.S. PATENT DOCUMENTS

| | | | |
|---|---|---|---|
| 8,033,156 B2* | 10/2011 | Housen | 73/11.01 |
| 8,106,769 B1* | 1/2012 | Maroney et al. | 340/540 |
| 8,400,299 B1* | 3/2013 | Maroney et al. | 340/540 |
| 8,749,381 B1* | 6/2014 | Maroney et al. | 340/540 |
| 2004/0112353 A1 | 6/2004 | Stewart et al. | |
| 2009/0255201 A1 | 10/2009 | Kraus, Jr. et al. | |
| 2009/0326822 A1* | 12/2009 | Housen et al. | 702/3 |
| 2009/0326835 A1* | 12/2009 | Housen | 702/41 |
| 2011/0241704 A1 | 10/2011 | Laflamme et al. | |
| 2014/0230574 A1* | 8/2014 | Ayon et al. | 73/862.625 |

OTHER PUBLICATIONS

ASTM International, Designation: D 3746-85 (Reapproved 2002), Standard Test Method for Impact Resistance of Bituminous Roofing Systems (Copyright dated 2002).

PanelTec, Product Data Sheets (available Oct. 2012).

* cited by examiner

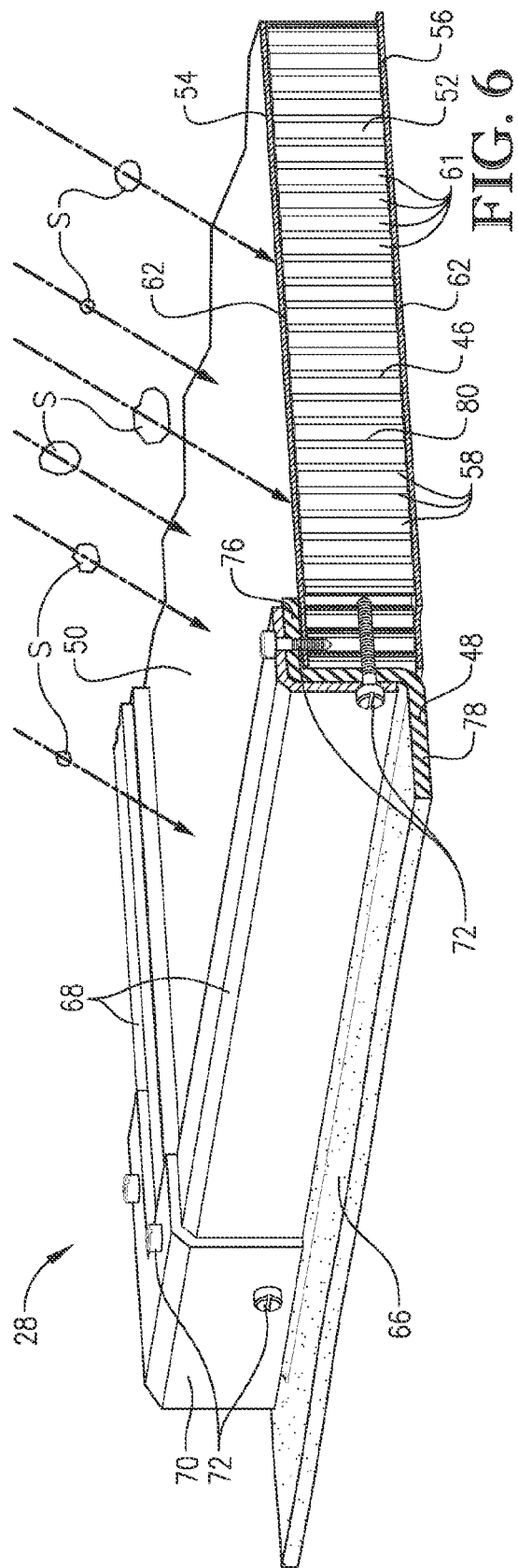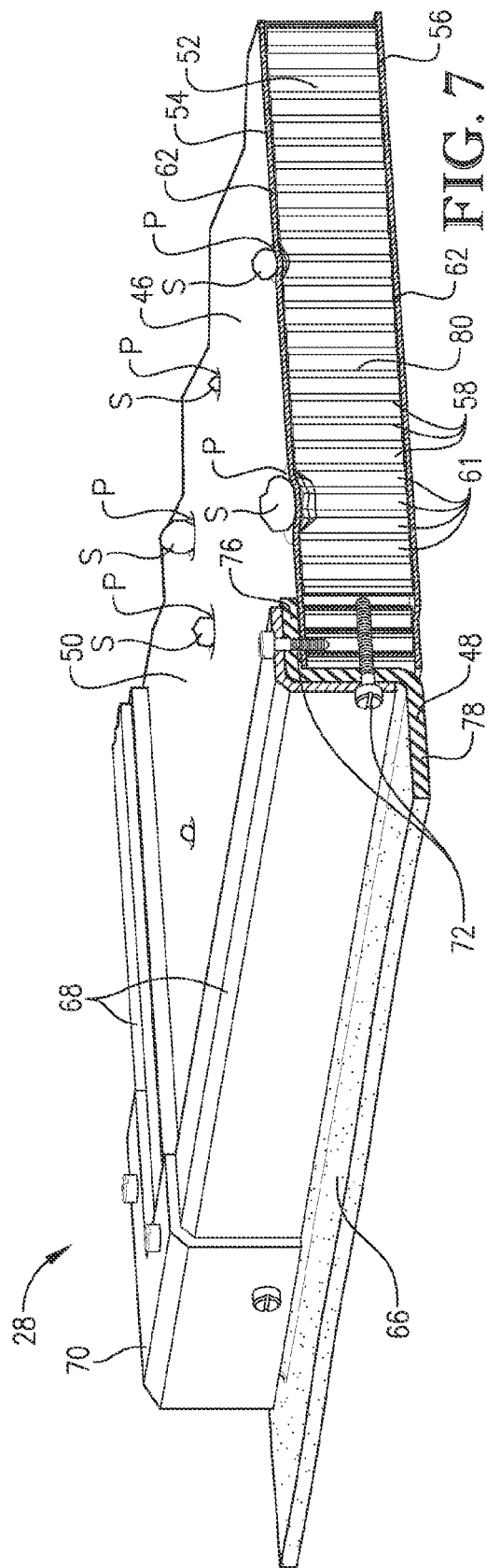

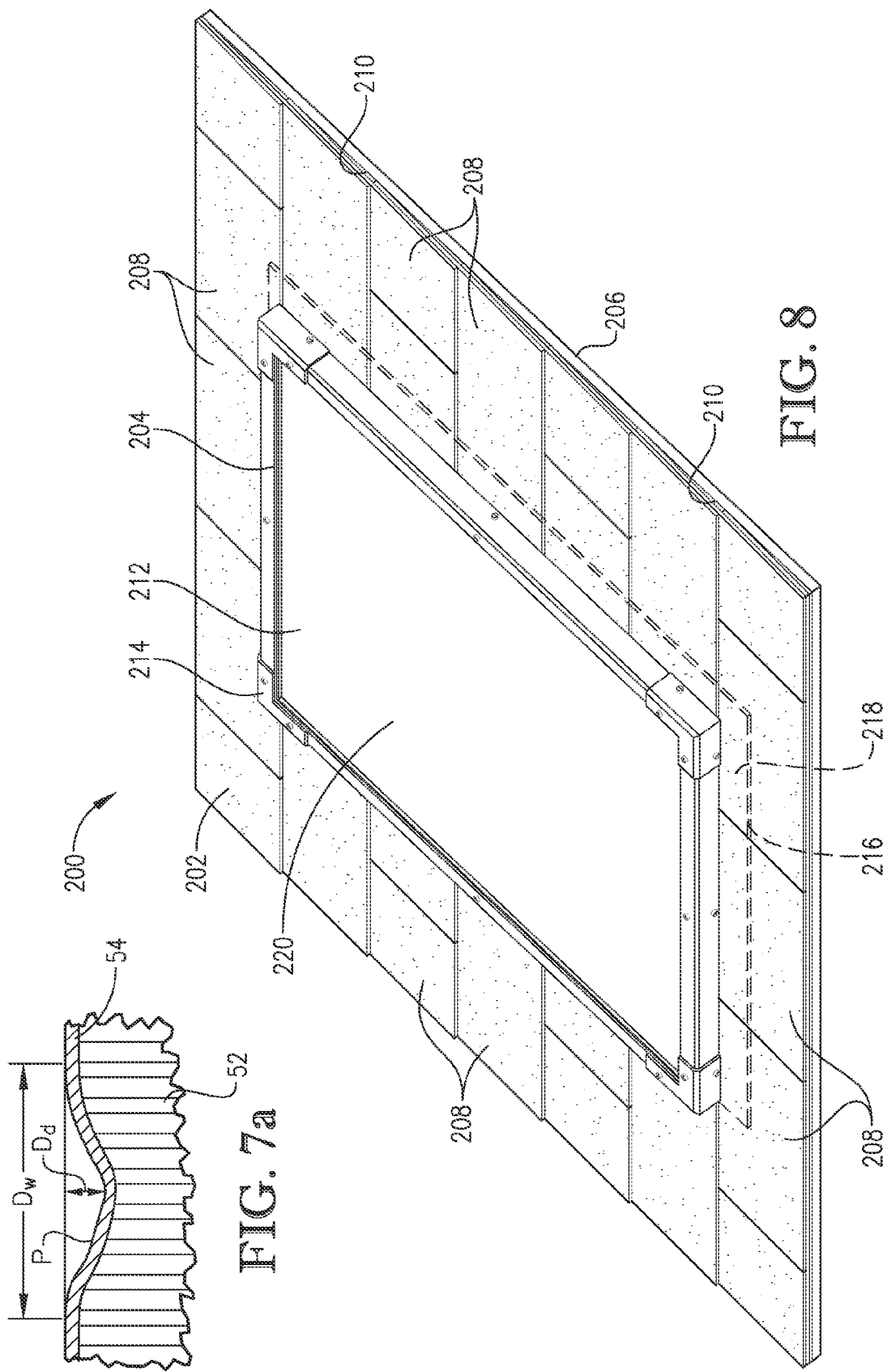

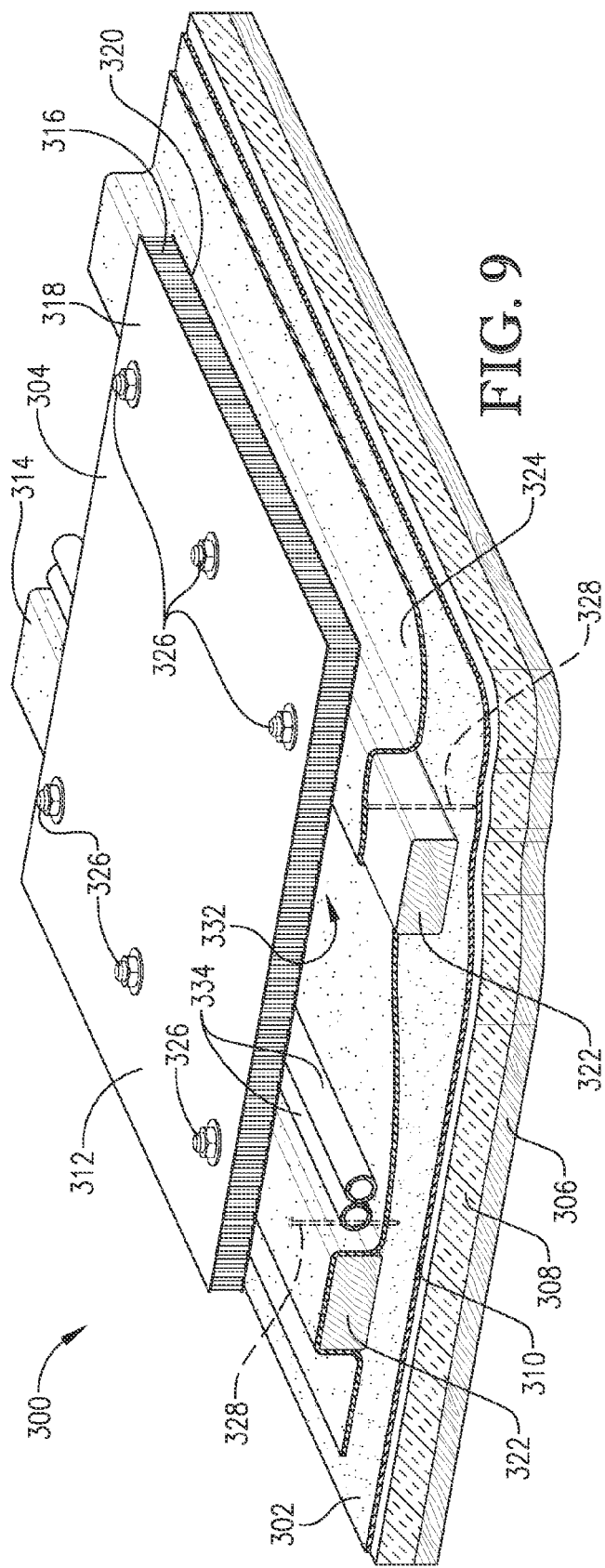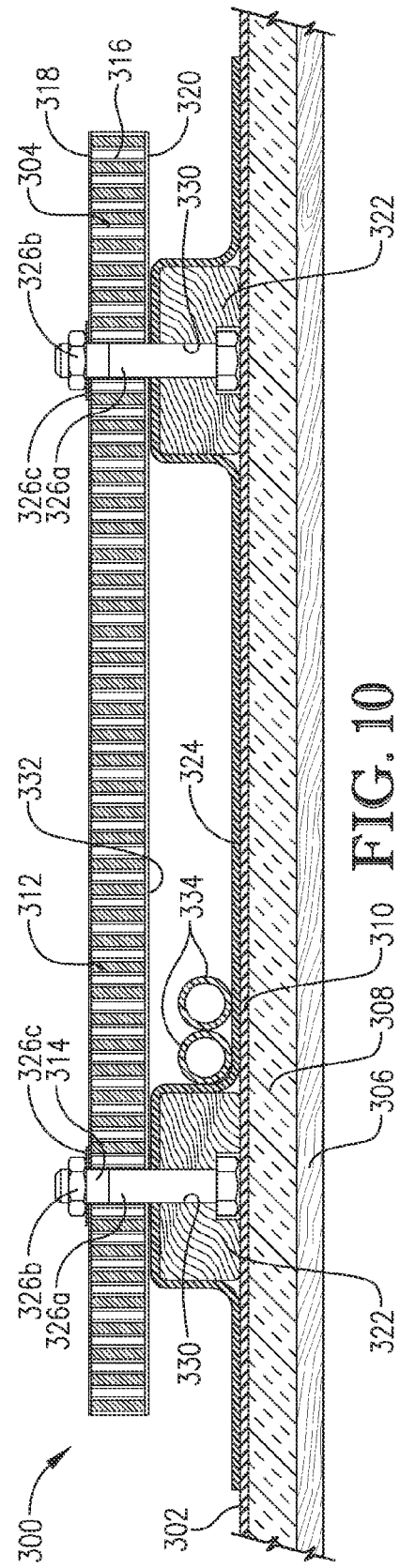

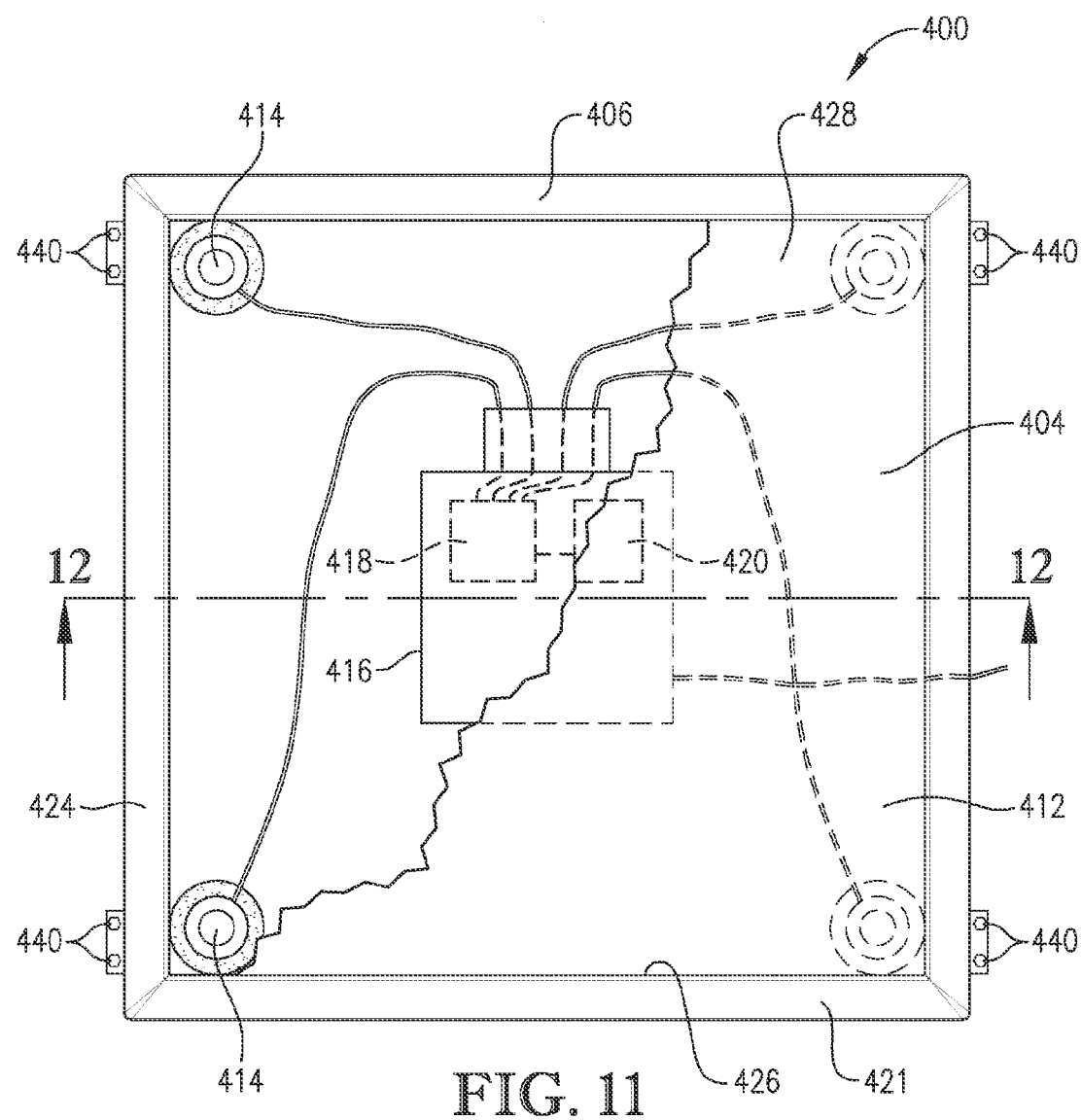
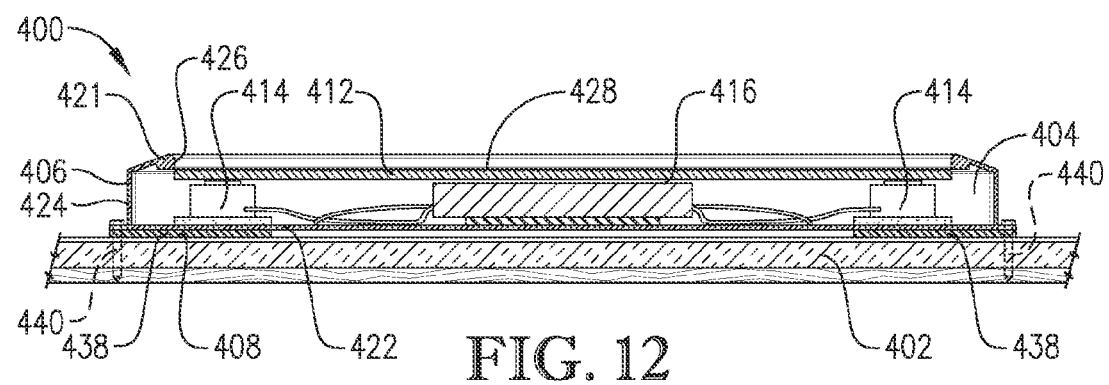

SYSTEM FOR RECORDING INFORMATION ASSOCIATED WITH HAIL STORM EVENT AND DETERMINING STRUCTURE DAMAGE BASED ON SAME

RELATED APPLICATION

This application claims the benefit of U.S. Provisional Application Ser. No. 61/591,590, filed Jan. 27, 2012, entitled SYSTEM FOR RECORDING INFORMATION ASSOCIATED WITH HAIL STORM EVENT AND DETERMINING STRUCTURE DAMAGE BASED ON SAME, and also claims the benefit of U.S. Provisional Application Ser. No. 61/710,544, filed Oct. 5, 2012, entitled SYSTEM FOR RECORDING INFORMATION ASSOCIATED WITH HAIL STORM EVENT AND DETERMINING STRUCTURE DAMAGE BASED ON SAME, each of which is hereby incorporated in its entirety by reference herein.

BACKGROUND

1. Field

The present invention relates generally to measurement and recording of structural damage data. More specifically, embodiments of the present invention concern a recording device for use as part of a roof assembly to record hail strike data associated with one or more hail strikes and to use the recorded data to determine damage to the roof.

2. Discussion of Prior Art

Those ordinarily skilled in the insurance and construction industries will understand that hail storms are able to inflict significant damage to roofs and other building features. Hail damage evaluation is typically based upon eye witness reports, post-storm examination of building materials including a visual comparative analysis of damaged and undamaged roof materials, identification and examination of damage to other adjacent building features, and analysis of recorded weather data. The threshold for damage sufficient to require roof replacement is typically determined by testing a sample of roof material.

However, conventional methods of determining the amount of damage to a particular roof are deficient for various reasons. For instance, the above methods involve analysis that is often highly subjective, such as visual inspection of the roof membrane and surrounding building components. Roof membrane materials are notoriously inaccurate as a gauge for the severity of hail strikes. For example, conventional membranes that have sustained deformation, cracking, or tearing damage may appear to be visually undamaged. On the other hand, visual depressions in such membranes can suggest that the hail strike intensity is more severe than was actually experienced by the roof.

SUMMARY

The following brief summary is provided to indicate the nature of the subject matter disclosed herein. While certain aspects of the present invention are described below, the summary is not intended to limit the scope of the present invention.

Embodiments of the present invention provide a recording device that does not suffer from the problems and limitations of the prior art methods set forth above.

A first aspect of the present invention concerns a hail strike recording device operable to provide quantifiable information about a hail storm event experienced by a roof. The recording device broadly includes a sacrificial panel component and a mounting assembly. The sacrificial panel component includes a deformable hail impact zone. The impact zone is calibrated so that deformation caused by a hail strike corresponds with a known impact energy. The mounting assembly is configured to support the panel component on the roof. The mounting assembly is fixedly coupled to the panel component and includes an anchor operable to be secured to the roof. The mounting assembly is configured to support the panel component adjacent the roof so that the hail impact zone faces skyward in generally the same orientation as the roof, such that the impact energy absorbed by the impact zone is substantially similar to that which would have been experienced by the roof if the hail had struck the roof rather than the panel component.

A second aspect of the present invention concerns a roof assembly for a building structure. The roof assembly broadly includes a roof and a hail strike recording device. The roof is exposed to hail storm events. The hail strike recording device is operable to provide quantifiable information about a hail storm event experienced by the roof. The recording device includes a sacrificial panel component and a mounting assembly. The sacrificial panel component includes a deformable hail impact zone. The impact zone is calibrated so that deformation caused by a hail strike corresponds with a known impact energy. The mounting assembly supports the panel component adjacent the roof so that the hail impact zone faces skyward in generally the same orientation as the roof, such that the impact energy absorbed by the impact zone is substantially similar to that which would have been experienced by the roof if the hail had struck the roof rather than the panel component.

A third aspect of the present invention concerns a roof assembly for a building structure. The roof assembly broadly includes a roof and an electronic hail strike recording device. The roof is exposed to hail storm events. The electronic hail strike recording device is operable to provide data about a hail storm event experienced by the roof. The recording device includes a platen, a processing unit, and a mounting assembly. The platen presents an upwardly directed platen face operable to be impacted by hail. The electronic sensor is operably coupled to the platen to sense a platen parameter associated with a hail strike. The sensor provides output signals corresponding to the sensed platen parameter. The processing unit is operably coupled to the sensor to receive and store the output signals from the sensor. The mounting assembly supports the platen adjacent the roof so that the platen face faces skyward in generally the same orientation as the roof, such that hail strikes against the platen face are substantially similar to hail strikes against the roof.

A fourth aspect of the present invention concerns a method of assessing the affect of a hail storm event experienced by the roof of a building structure. The method broadly includes the steps of having information recorded about hail strikes substantially similar to those experienced by the roof; determining the impact energy that corresponds with at least one of the hail strikes; and applying the determined impact energy against a sample of the roof.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein:

FIG. 6 is a fragmentary perspective of the recording device shown in FIGS. 1-3, with part of the recording device being cross sectioned to show attachment of the mounting assembly to the panel component;

FIG. 7 is a fragmentary perspective of the recording device similar to FIG. 6, but showing the recording device in an indented condition, with depressions being caused by hail stones;

FIG. 7a is a greatly enlarged fragmentary cross section of the recording device in the indented condition as shown in FIG. 7, showing width and depth dimensions of one of the depressions;

FIG. 8 is an upper perspective of a roof assembly constructed in accordance with a second embodiment of the present invention, with a hail strike recording device being deployed on a pitched roof and attached to composite shingles of the pitched roof;

Figure 13:
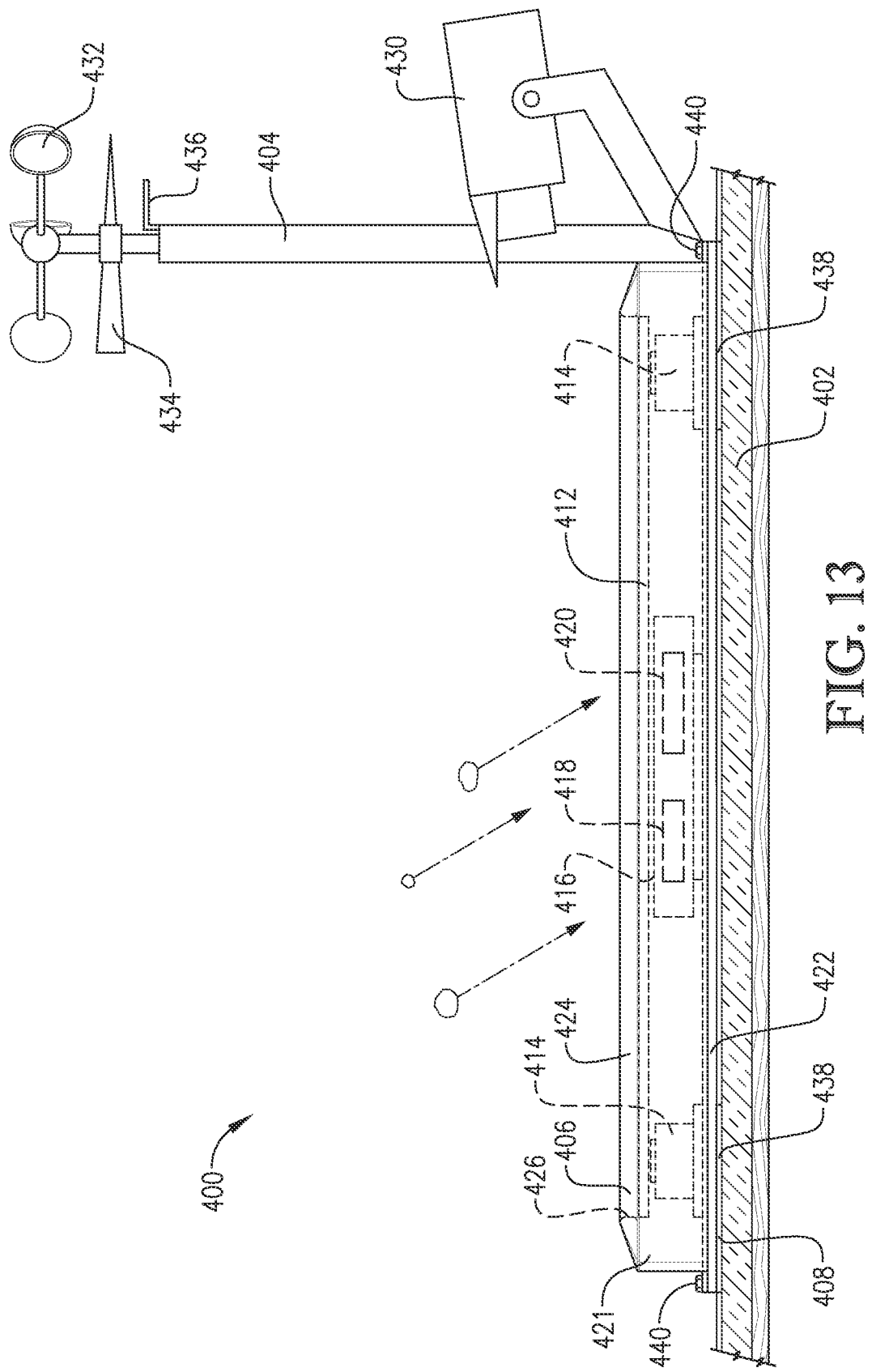

FIG. 9 is an upper perspective of a roof assembly constructed in accordance with a third embodiment of the present invention, showing a roof section and a recording device of the roof assembly, where the recording device includes a panel component and a mounting assembly that secures the panel component to the roof at a location spaced above the roof, and with the mounting assembly including a pair of studs, a membrane that covers the studs, nails that penetrate the roof membrane and secure the studs to the roof, and threaded fastener assemblies that secure the studs to the panel component;

FIG. 10 is a cross section of the roof assembly shown in FIG. 9, showing the studs and panel component secured to each other by the fastener assemblies, with the panel component being spaced above the roof to define an open space therebetween;

FIG. 11 is a fragmentary top view of a roof assembly constructed in accordance with a fourth embodiment of the present invention, with the roof assembly including a roof section and an electronic recording device, and with the recording device including a frame, a platen, load cells, and a controller having a processor operably coupled to a memory element and to the load cells;

FIG. 12 is a fragmentary cross section of the roof assembly taken along line 12-12 in FIG. 11, showing the platen supported on the load cells; and FIG. 13 is a side elevation of the roof assembly shown in FIGS. 11 and 12, showing a video camera, wind anemometer, wind direction sensor, and temperature sensor installed as part of the recording device.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Figure 1:
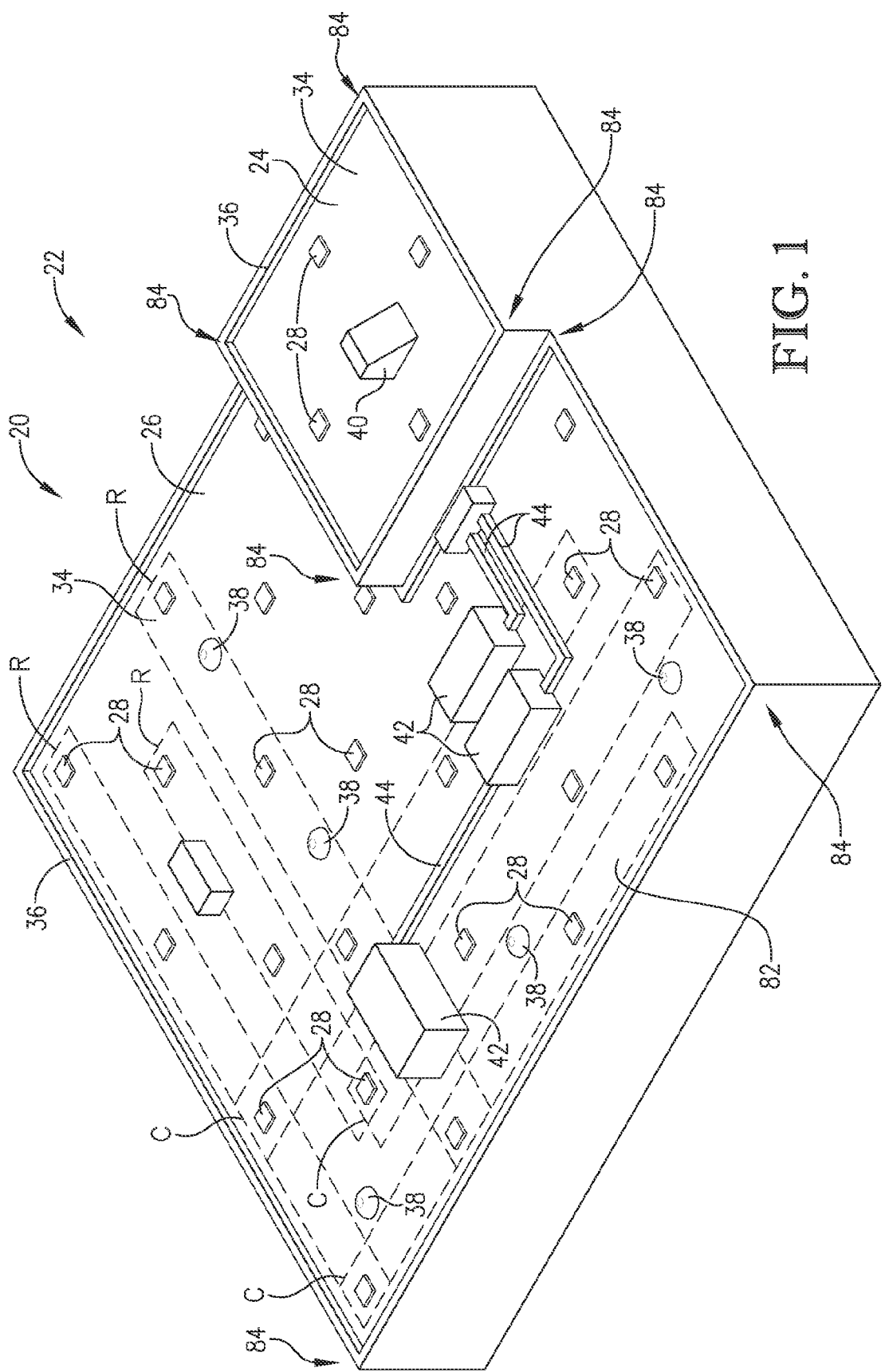
FIG. 1 is an upper perspective of a building with a roof assembly constructed in accordance with a first embodiment of the present invention, with the roof assembly including upper and lower roof sections and multiple hail strike recording devices deployed on the roof sections.
Figure 2:
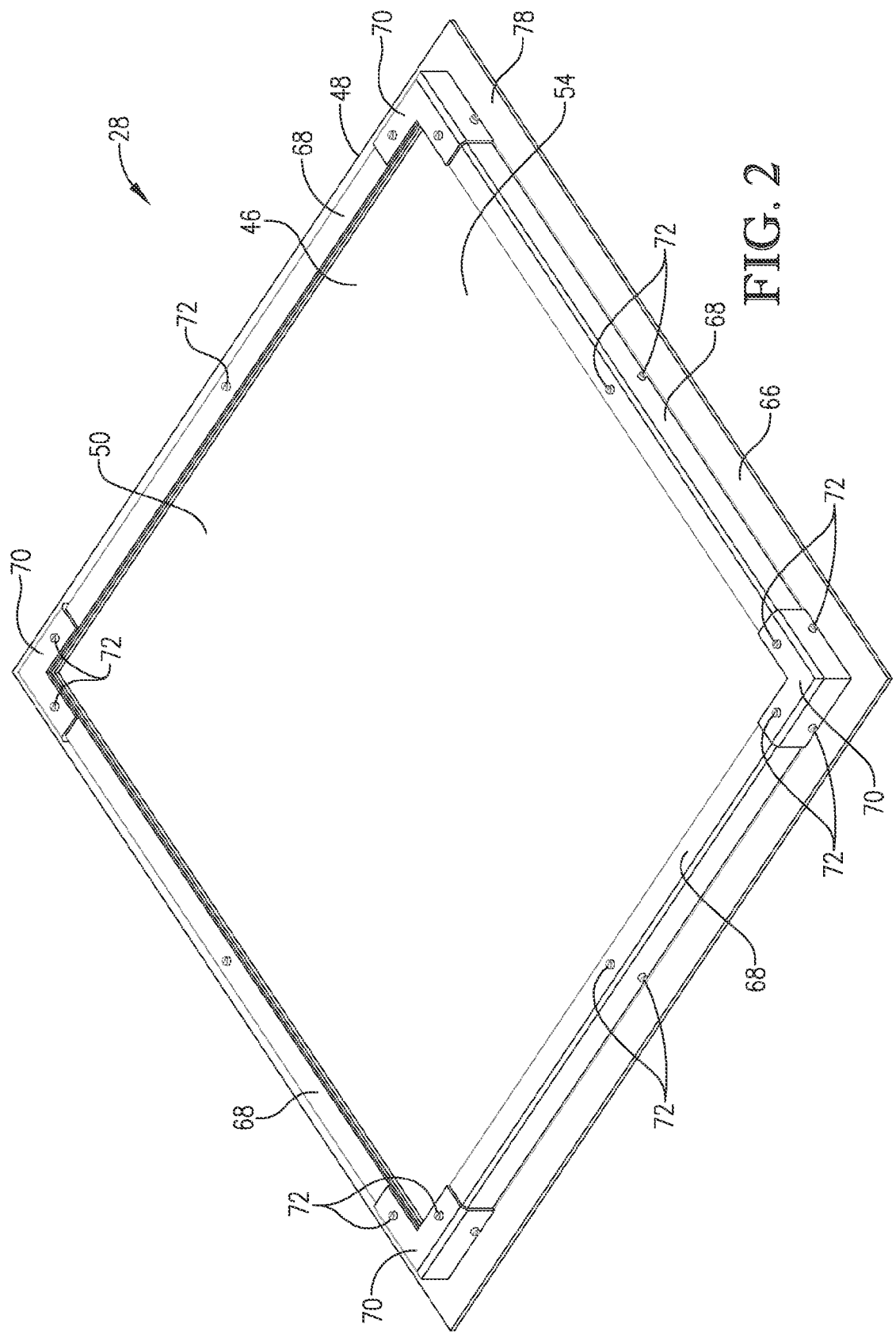
FIG. 2 is a fragmentary upper perspective of the roof assembly shown in FIG. 1, showing a panel component and a mounting assembly of one of the recording devices.
Figure 3:
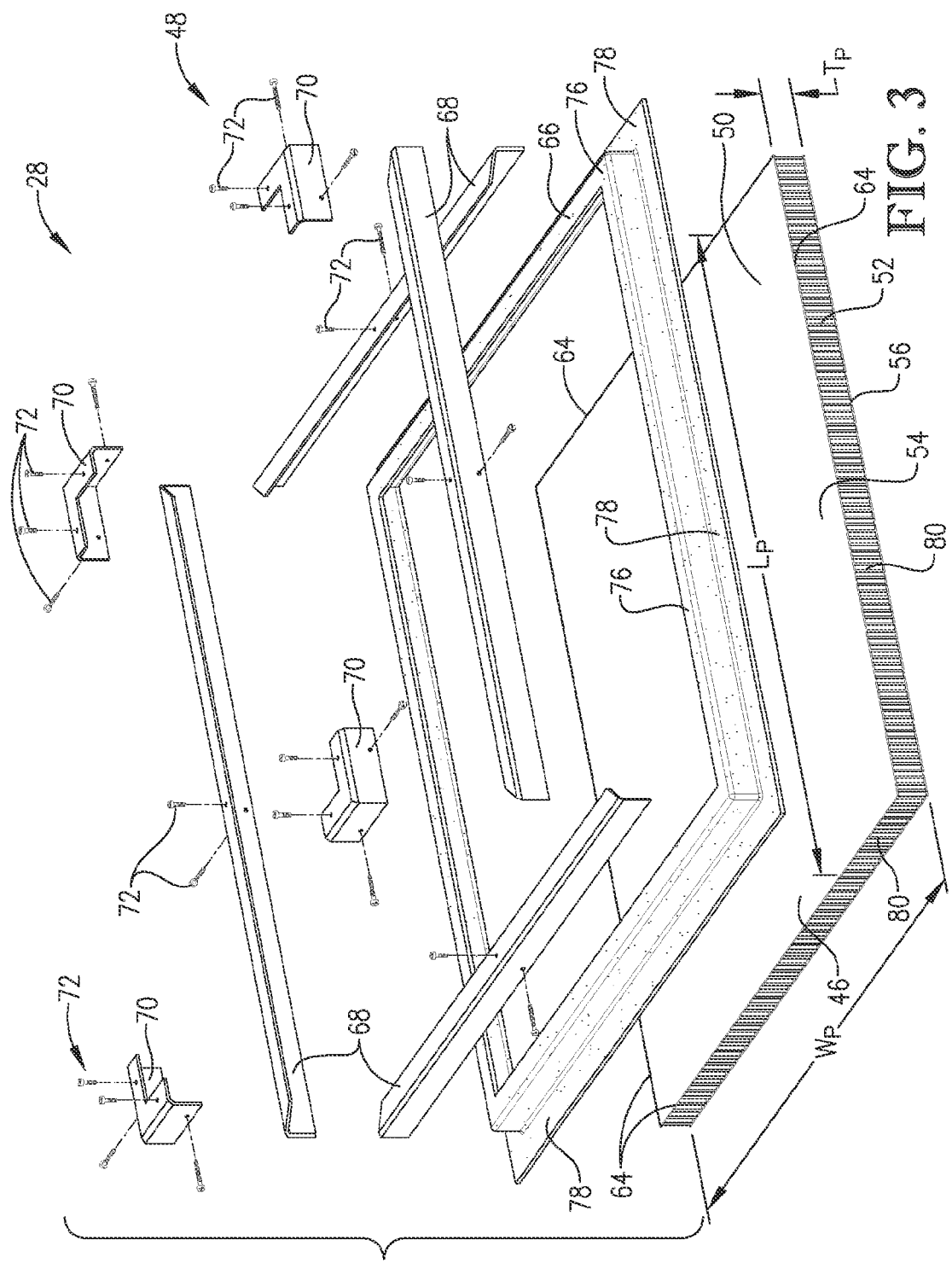
FIG. 3 is an exploded perspective of the recording device shown in FIGS. 1 and 2, showing the mounting assembly exploded from the panel component, as well as the attachment membrane, mounting brackets, and fasteners of the mounting assembly.
Figure 4:
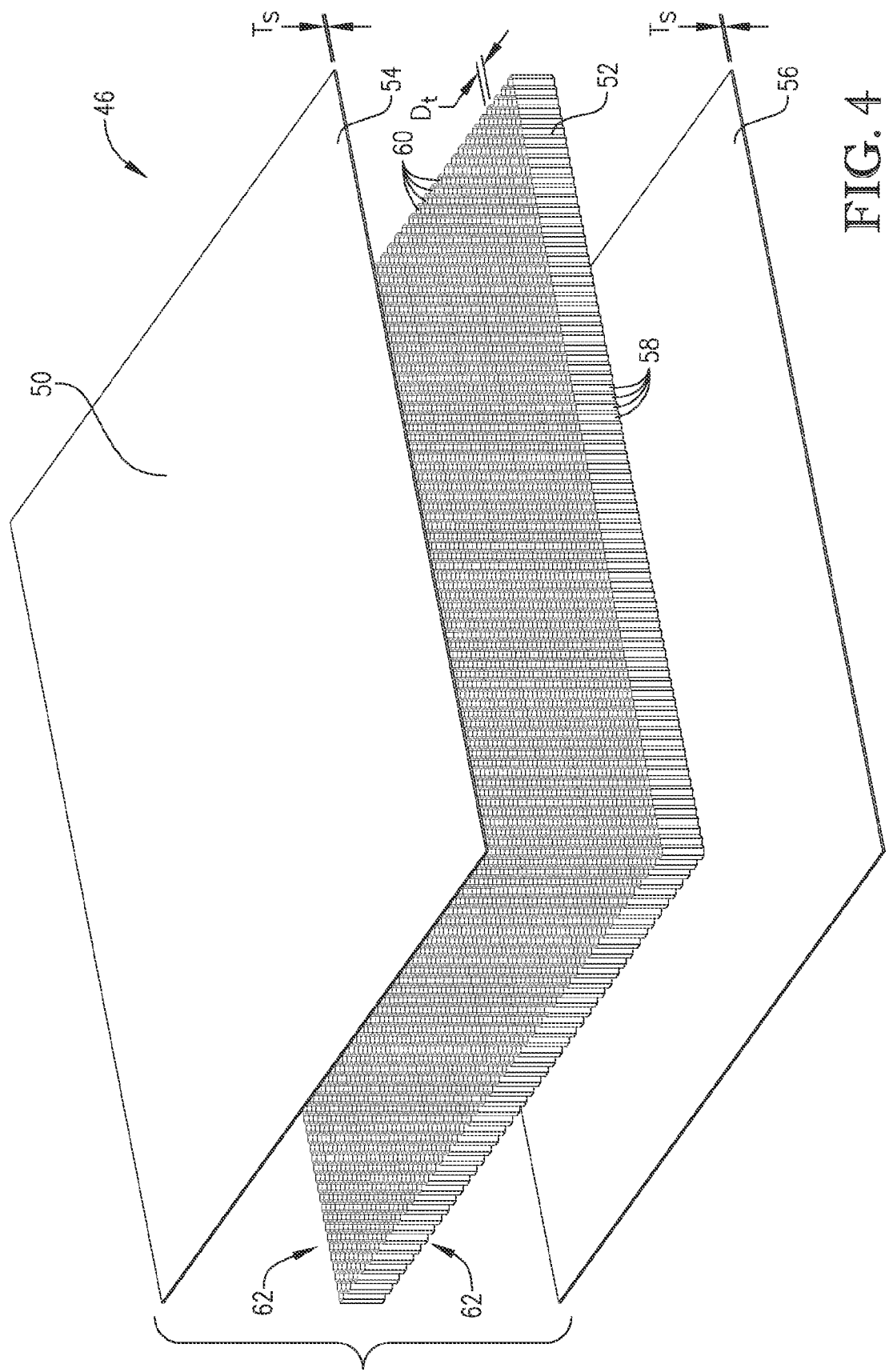
FIG. 4 is an exploded perspective of the panel component shown in FIGS. 1-3, showing a panel core separated from upper and lower panel sheets.

Turning initially to FIG. 1, a roof assembly 20 is constructed in accordance with a first embodiment of the present invention to record information about one or more hail strikes and evaluate any roof damage caused by the hail strikes. It will be appreciated that hail stones can vary significantly in size and mass. For instance, hail stone diameter can range from pea-size to softball-size. Generally, pea-size or smaller hail causes very little to no damage to most conventional roofs having a bitumen membrane. Thus, the present invention is generally not needed to sense such small hail stones. Also, because baseball-size and softball-size hail generally cause significant roof damage, the present invention is not needed to sense these very large hail stones. However, it has been found that the present invention is very effective for sensing the presence of hail stone sizes that range between these very small and very large hail stone sizes. Preferably, the illustrated hail strike recording device can record a hail strike with an impact energy that ranges from about 2.5 ft-lb to about 25 ft-lb and, more preferably about 5 ft-lb to about 25 ft-lb. For the illustrated recording device to operably record hail strikes in these ranges of impact energy, it is necessary for the panel component of the recording device to plastically deform where panel component is contacted by and absorbs the impact energy of the hail stone.

The illustrated roof assembly 20 is provided as part of a stationary building 22. While the building 22 has a generally rectangular floor plan, the principles of the inventive roof assembly 20 are applicable to buildings of various sizes and/or configurations. It will also be appreciated that the building 22 can be employed for various purposes without departing from the scope of the present invention.

Figure 5:
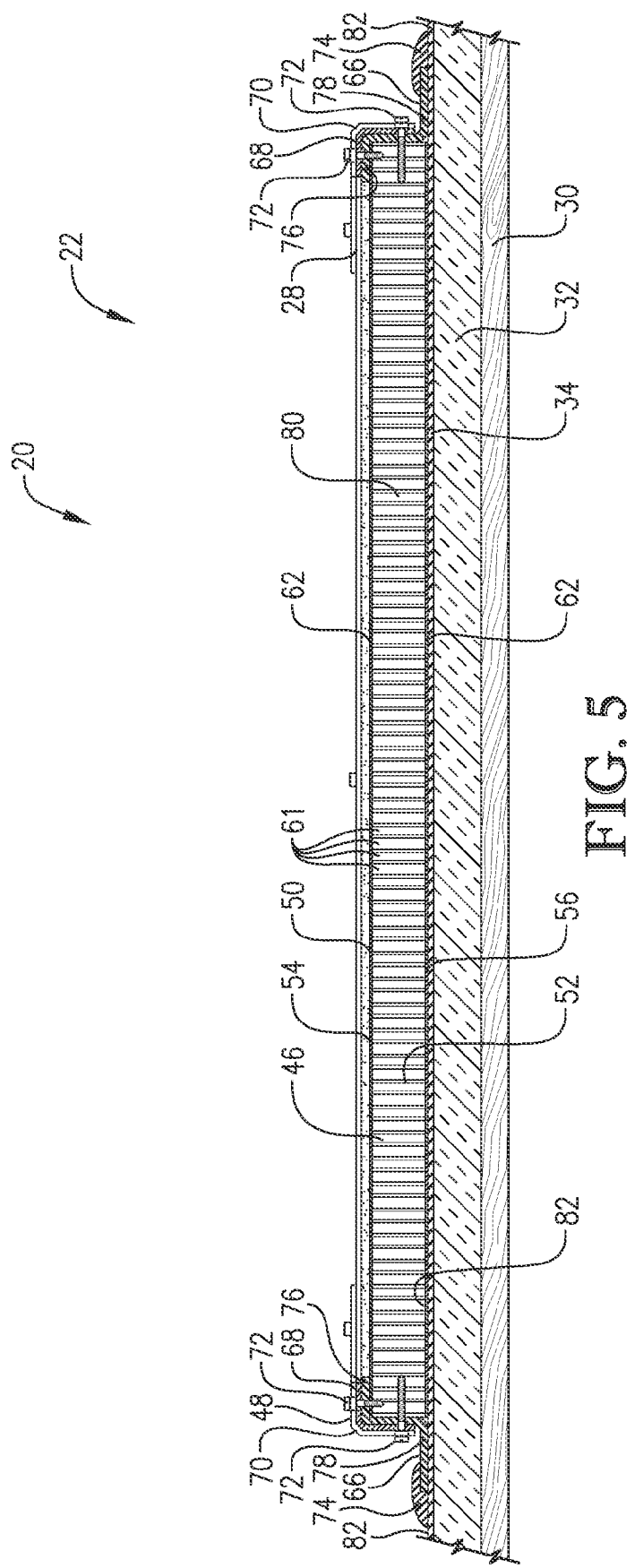
FIG. 5 is a cross section of the roof assembly shown in FIGS. 1 and 2, showing the attachment membrane, mounting brackets, fasteners, and sealing layer of the mounting assembly.

Turning to FIGS. 1 and 5, the roof assembly 20 preferably includes upper and lower roof sections 24,26 and a plurality of hail strike recording devices 28. Each roof section 24,26 comprises a conventional flat roof construction and includes a roof deck 30, a substrate board 32, a bitumen roof membrane 34, and a surrounding parapet 36. Also, the roof deck 30 is preferably supported on a building framework (not shown), such as trusses, beams, and/or arches. It will be appreciated that the illustrated roof could have an alternative construction without departing from the scope of the present invention. For instance, the flat roof could include an alternative bitumen roofing, such as a multiple layer built-up bitumen roof construction. Also, as will be depicted, the roof could include a pitched roof section. Other roofing materials are also within the ambit of the present invention.

The illustrated roof sections 24,26 support various exposed roof elements and equipment such as vents 38, a roof access 40, HVAC equipment 42, and conduits 44 (see FIG. 1). However, such exposed elements could be alternatively configured, e.g., based upon building requirements. It will also be appreciated that the roof sections 24,26 could be variously sized and shaped. Yet further, the illustrated roof could include an alternative number of roof sections instead of the two (2) roof sections 24,26 shown. As will be discussed, one or more recording devices 28 can be selectively positioned along the roof sections 24,26 to provide optimal sensing of the hail storm event. For instance, one or more recording devices 28 can be positioned to avoid event sensing interference by one of the exposed elements and or one of the parapets 36. The size of the roof will also often impact the number of recording devices installed.

Turning to FIGS. 2-7, the recording device 28 is preferably deployed to instrument the roof sections 24,26 so that one or more hail strikes can be sensed near the roof. Furthermore, subsequent to a hail storm event, data associated with the hail storm event is preferably retrieved from the recording device 28, as will be discussed in greater detail.

The recording device 28 preferably includes a panel component 46 and a mounting assembly 48 that secures the panel component 46 to the roof. The illustrated panel component 46 comprises a structure that is preferably deformable and continuous throughout. The structure is deformable in response to a hail strike so as to sense a quantifiable property of the hail strike. The illustrated panel component 46 includes a deformable hail impact zone 49 and an outer panel attachment margin 64 that surrounds the impact zone, as will be discussed. The impact zone 49 presents an exposed hail impact zone surface 50. In the illustrated embodiment, the impact zone 49 is positioned laterally between the outer panel attachment margin because the mounting assembly 48 covers the outer panel attachment margin. However, it is within the scope of the present invention where additional parts of the panel component 46, or even the entire panel component 46, present the hail impact zone 49. This illustrated panel component 46 is particularly suitable for such an alternative configuration because its construction is consistent throughout. For instance, the mounting assembly 48 could be configured to attach to the sides of the panel component 46 without covering the upper sheet of the panel. Also, one or more sides of the panel component 46 could be positioned against corresponding sides of one or more other panel assemblies to cooperatively form a hail sensing panel. The impact zone surface 50 is generally exposed and faces skyward in generally the same orientation as the roof when the panel component 46 is mounted on the roof, with the impact zone surface 50 being deformable in response to the hail strike. As will be discussed the hail impact zone is preferably calibrated so that deformation caused by a hail strike corresponds with a known impact energy.

The illustrated panel component 46 preferably includes a deformable panel core 52 and opposite upper and lower sheets 54,56. The panel core 46 preferably comprises an aluminum honeycomb structure that includes a plurality of interconnected fins that cooperatively form an array (i.e., a pattern) of hexagonal-shaped tubes 58 formed alongside and extending generally parallel to one another. In other words, the interconnected fins are arranged to present a honeycomb pattern. However, it will be appreciated that the fins could be arranged to form a different honeycomb-like pattern or an alternative array pattern. Again, each tube 58 preferably has a generally hexagonal cross-sectional shape and presents an elongated cavity 60. When the sheets 54,56 are fixed to the panel core 52, the cavities 60 and sheets 54,56 cooperatively define corresponding enclosed chambers 61 of the panel component 46 (see FIGS. 5-7). The illustrated chambers 61 preferably comprise hollow, discrete chambers within the panel, where the chambers are generally not exposed to ambient conditions.

The impact zone 49 generally extends in a vertical direction along the thickness of the upper sheet 54, although the impact zone 49 can also extend at least partly into the thickness of the panel core 46. Thus, for some situations, where the panel component 46 is exposed to a hail storm event and presents multiple relatively shallow indentations (i.e., depressions), the panel component 46 could be reinstalled in an inverted position so that the lower sheet 56, which has no indentations, faces upwardly. Furthermore, the impact zone 49 could extend from the upper sheet 54 to the lower sheet 56, particularly when the panel is exposed to large hail.

For some aspects of the present invention, the tubes 58 could have an alternative cross-sectional geometrical shape, such as a square, rectangle, triangle, or circle. Preferably, the arrayed tubes 58 cooperatively present opposite faces 62 of the panel core 52. It is also within the ambit of the present invention for the wall structure forming the panel core 52 to be alternatively configured so as not to form tubes, as further discussed below. Each tube 58 preferably presents a cross-sectional width dimension Dt that ranges from about one-eighth (⅛) inch to about one-half (½) inch and, more preferably, is about one-quarter (¼) inch (see FIG. 4).

The panel core 52 could have a fin arrangement other than the interconnected tubes 58, while maintaining the desired deformability of the panel core 52. Such an alternative arrangement may or may not include fins that are interconnected. For instance, the panel core 52 could include a plurality of continuous parallel fins that extend longitudinally in the same direction and cooperatively presents spaced apart elongated channels. Each of the parallel fins may or may not be directly attached to (or formed with) adjacent ones of the parallel fins.

It has been found that the illustrated panel core construction cooperates with the upper and lower sheets 54,56 to provide a panel component 46 that plastically deforms in response to a range of hail strikes. However, it is within the ambit of the present invention where the panel core 52 is alternatively configured so that the panel component 46 is similarly deformable. Again, the panel core 52 could have various types of fin arrangements. Furthermore, the panel core 52 could have another structure that presents a series of discrete chambers 61 to permit deformation of the panel core 52. Yet further, the panel core 52 could include a substantially homogeneous material that fills the space between the sheets, with deformation caused by hail strikes causing compression of the material.

While the panel core 52 is preferably made from aluminum, the panel core 52 could include an alternative material, such as an alternative metal and/or synthetic resin material, without departing from the scope of the present invention.

The upper and lower sheets 54,56 each preferably comprise a continuous aluminum sheet. However, the sheets 54,56 could be formed of an alternative material, such as an alternative metal and/or synthetic resin material, without departing from the scope of the present invention. The sheets 54,56 each present a sheet thickness dimension Ts that ranges from about one hundredth (0.01) of an inch to about five hundredths (0.05) of an inch and, more preferably, is about four hundredths (0.04) of an inch (see FIG. 4). For some aspects of the present invention, the sheets 54,56 could be alternatively shaped and/or configured.

The sheets 54,56 are each preferably adhered to a corresponding one of the faces 62 so that the core 52 is interposed between the sheets 54,56 to form a composite panel. The illustrated panel component 46 preferably presents a panel thickness dimension Tp that ranges from about one-half (½) inch to about two (2) inches and, more preferably, is about one (1) inch (see FIG. 3). The panel component 46 also presents length and width dimensions Lp,Wp that preferably range from about one (1) foot to about ten (10) feet and, more preferably are each about four (4) feet (see FIG. 3).

The sheets 54,56 are preferably substantially planar prior to installation and initial use of the recording device 28. When used in connection with sheets 54,56, the term "substantially planar" preferably refers to a maximum surface deviation of the sheet, measured along the direction normal to the sheet surface, that ranges from about zero (0) inches to about two (2) inches and, more preferably, from about zero (0) inches to about one (1) inch, wherein the sheet surface has a lateral dimension no larger than four (4) feet. However, for some aspects of the present invention, one or both of the sheets 54,56 could be configured so that the sheet surface has a nonplanar shape (e.g., where the surface presents a concave, convex, or concavo-convex shape).

The substantially planar sheets 54,56 are also preferably substantially parallel to one another. In other words, the panel thickness dimension Tp is substantially constant throughout the panel, although the dimension Tp could vary across the panel without departing from the scope of the present invention. When used in connection with sheets 54,56, the term "substantially parallel" preferably refers to a maximum distance deviation, measured between the sheets, that ranges from about zero (0) inches to about two (2) inches and, more preferably, from about zero (0) inches to about one (1) inch, wherein the sheets have a lateral dimension no larger than four (4) feet.

Although both sheets 54,56 are preferably included as part of the panel component 46, for some aspects of the present invention, the panel may not include both sheets 54,56. For instance, it may be possible where the panel component 46 only includes the panel core 52 and a single one of the sheets (such as the upper sheet 54). Yet further, it is possible that the panel component 46 includes neither of the sheets 54,56. For example, a layer structure having a shape and/or properties similar to a continuous sheet could be integrally formed as part of the panel core 52 along one or both faces of the panel core 52 (e.g., where a layer structure is integrally molded or cast as part of the panel core 52).

The panel component 46 preferably presents an outer margin 64. As will be discussed, the outer margin 64 preferably serves as an attachment margin that is engaged by the mounting assembly 48 to secure the panel component 46 to the roof.

The illustrated impact zone surface 50 preferably has a generally square shape when viewing the surface along a direction normal to the surface 50. However, it is within the scope of the present invention where the impact zone surface 50 has an alternative geometric shape, such as a rectangle, circle, triangle, hexagon, octagon, etc. The impact zone surface 50 is also preferably substantially planar prior to installation and initial use of the recording device 28. When used in connection with the impact zone surface 50, the term "substantially planar" preferably refers to a maximum surface deviation of a reference impact zone surface 50, measured along the direction normal to the surface 50, that ranges from about zero (0) inches to about two (2) inches and, more preferably, from about zero (0) inches to about one (1) inch, wherein the reference impact zone surface 50 has a lateral dimension no larger than four (4) feet.

However, for some aspects of the present invention, the recording device 28 could be configured so that the impact zone surface 50 has a nonplanar shape (e.g., where the surface 50 presents a concave, convex, or concavo-convex shape).

When the panel component 46 is supported only along the outer margin 64 thereof (see FIG. 3), the panel component 46 preferably resists any plastic deformation in response to static loads applied to the upper sheet 54. For instance, when the recording device 28 is installed, it is believed that a person could, purposely or inadvertently, stand on the panel component 46 or position tools or equipment on the panel component 46. Consequently, the panel component 46 is preferably constructed to resist plastic deformation when exposed to a maximum static pressure that ranges from about fifty pounds per square inch (50 psi) to about seventy-five pounds per square inch (75 psi).

The illustrated panel component 46 is preferably a composite aluminum panel, Model No. ALA 1.0"×4×10 HD, manufactured by Paneltec LLC of Lafayette, Colo. However, one suitable alternative panel construction is Model No. ALA 1.04896, manufactured by Paneltec LLC.

Each recording device 28 also preferably includes an identification plate (not shown) that presents identification indicia that is unique to the recording device 28 and, therefore, uniquely identifies the recording device 28. Preferably, the indicia is in the visible form of a unique serial number, which could be printed, stamped, or otherwise permanently added to the identification plate. However, the indicia could have other visible forms (such as a scannable bar code) within the scope of the present invention. Yet further, the recording device 28 could have another element to uniquely identify itself, such as an electronic RFID chip.

Again, the recording device 28 preferably includes the mounting assembly 48 to secure the panel component 46 to the respective one of the roof sections 24,26. The illustrated mounting assembly 48 preferably includes an elongated bitumen attachment membrane 66, elongated mounting brackets 68,70, fasteners 72, and a sealing layer 74 (see FIG. 5).

The attachment membrane 66 presents inner and outer margins 76,78. The attachment membrane 66 is preferably positioned so that the inner margin 76 lays flat along and engages the upper sheet 54 along the outer margin 64 of the panel component 46. That is, the inner margin 76 preferably forms an elongated upper strap element that engages the upper sheet 54. The attachment membrane 66 is placed into engagement (e.g., by being folded or preformed) with outermost sides 80 presented by the panel component 46. The attachment membrane 66 is also positioned and/or formed so that the outer margin 78 is generally parallel to the inner margin 76 and adjacent the lower sheet 56, with the outer margin 78 projecting outboard of the outer margin 64 of the panel component 46. In other words, the outer margin 78 preferably forms an elongated lower strap element that is operable to engage the roof, as will be discussed.

The mounting brackets 68,70 preferably comprise sections of conventional flashing material, although the brackets 68,70 could be formed of other material consistent with the scope of the present invention. The mounting brackets 68,70 are preferably secured to the attachment membrane 66 and the panel component 46 along the outer margin 64 with fasteners 72, with the inner margin 76 being secured between the panel component 46 and mounting brackets 68,70. Again, the outer margin 64 serves as an attachment margin that is engaged by the mounting assembly 48 to secure the panel component 46 to the roof. While the illustrated mounting brackets 68,70 comprise flashing pieces that are preferred to engage and support the panel component 64, brackets having alternative shapes, dimensions, and/or materials could be employed without departing from the scope of the present invention.

The illustrated attachment membrane 66 preferably circumscribes the panel component 46 and provides an endless attachment structure. However, the principles of the present invention are applicable where the attachment membrane 66 does not extend continuously about the panel component 46. Also, the attachment membrane 66 and mounting brackets 68,70 cooperatively provide a continuous seal along the outer margin 64 of the panel component 46. It will be appreciated that an alternative seal arrangement could be provided without departing from the scope of the present invention.

The outer margin 78 of the attachment membrane 66 is preferably securely attached to the roof membrane 34 with the sealing layer 74. The sealing layer 74 preferably comprises a layer of bitumen material. The sealing layer 74 is preferably heated and applied at a temperature above ambient using conventional hot-mop techniques. However, the sealing layer 74 could also include an alternative material, such as an adhesive. In this manner, the mounting assembly 48 preferably does not penetrate the roof membrane 34 when the recording device 28 is attached to the roof. However, as will be shown in a subsequent embodiment, a recording device 28 could be attached with roof-penetrating fasteners.

While the illustrated mounting structure preferably has a bitumen attachment membrane 66, it is within the scope of the present invention where the membrane 66 includes an alternative material. Furthermore, the mounting structure could be devoid of the bitumen membrane, e.g., where only mounting brackets 68,70 are used to interconnect the panel to the roof. As will be shown in a subsequent embodiment, the illustrated panel could be attached using a mounting structure without conventional flashing. It is envisioned that the inventive recording device 28 can be secured to a roof structure with various mounting mechanisms, based on several factors (e.g., cost, convenience, reliability, etc.), within the scope of the present invention.

The illustrated mounting assembly 48 permits convenient and quick securement of the panel component 46 on the respective one of the roof sections 24,26. In a preferred application, the recording device 28 is preferably removable from the roof by separating the attachment membrane 66 of the mounting assembly 48 from the roof membrane 34. The illustrated mounting assembly 48 is preferably not used to re-secure the first panel component 46 or to secure another panel component 46 after the first panel component 46 is removed from the roof. This is because removal of the attachment membrane 66 from the roof membrane 34 could cause damage to the attachment membrane 66 and/or the mounting brackets 68,70.

However, the principles of the present invention are applicable where the panel component 46 is removed from the roof by removing the fasteners 72. Thus, in some applications, the mounting assembly 48 could be used to re-secure the first panel component 46 to the roof or to secure another panel component 46 to the roof after the first panel component 46 is removed.

The illustrated recording device 28 does not include electronic components to sense and/or record properties associated with a hail storm event or other ambient conditions. However, it is within the scope of the present invention where the recording device 28 has one or more electronic sensing and/or recording components. For instance, as will be shown in a subsequent embodiment, the recording device 28 could include a camera, a wind speed sensor, a detector to sense wind direction, a load sensor, and/or a temperature sensor. The recording device 28 could also include one or more cameras and/or sensors to scan and record data for later creating a three-dimensional representation of the impact zone surface 50. The recording device 28 could further include a series of pressure sensors, with each pressure sensor being in fluid communication with one of the enclosed chambers 61 in the panel core 52 to sense pressure in the chamber 61 when the chamber 61 is exposed to (and collapses in response to) a hail strike. Yet further, the recording device 28 could include a processing element and a memory element to collect data from one or more of the above-referenced electronic devices and record the collected data.

Each recording device 28 is preferably attached adjacent the respective one of the roof sections 24,26. As used herein, the term "adjacent the roof" preferably means alongside or slightly above the roof. More preferably, the term means on top of the roof, with any spacing therebetween being provided only by the mounting assembly to secure the recording device to the roof. Most preferably, the term means to lie flat against the roof.

Each recording device 28 is also preferably attached to the respective one of the roof sections 24,26 so that the impact zone surface 50 of the panel component 46 faces skyward in generally the same orientation as an exposed surface 82 of an adjacent part of the roof membrane 34 (see FIGS. 1 and 5). As used herein, "generally the same orientation" preferably means that surfaces 50,82 face the same direction. For example, with the illustrated flat surfaces 50,82, the direction normal (i.e., perpendicular) to the impact zone surface 50 is about the same as the direction normal to the exposed surface 82 of the roof. Furthermore, this also preferably means that the panel component 46, at least along the impact zone surface 50, presents a shape that closely conforms to that of the exposed surface 82 of the roof. For instance, with the illustrated flat surfaces 50,82, the impact zone surface 50 of the panel component 46 and the exposed surface 82 of the roof-present respective normal directions that preferably cooperatively define an included angle dimension ranging from about zero (0) degrees and to about ten (10) degrees and, more preferably, from about zero (0) degrees to about five (5) degrees. Most preferably, the impact zone surface 50 of the panel component 46 and the exposed surface 82 of the roof are both planar and are arranged in a substantially parallel relationship, with the included angle dimension being within the ranges discussed above or less.

With the preferred relationship of the surfaces 50,82 described above, the impact energy absorbed by the impact zone is substantially similar to that which would have been experienced by the roof if the hail had struck the roof rather than the panel component. This preferably means that hail strikes against the panel component (or platen, as described in a subsequent panel embodiment) exert an impact energy that is nearly identical to that which would have been absorbed by the roof if the hail had struck the roof instead. In other words, there is no meaningful difference (in terms of measuring roof damage) between the impact energy absorbed by the panel component (or platen) or the impact energy that would have been absorbed by the roof if the hail had struck the roof instead.

In the illustrated embodiment, multiple recording devices 28 are attached to the upper and lower roof sections 24,26. Preferably, each recording device 28 is attached so as to be laterally spaced from other projecting roof features that project vertically above the exposed surface 82 of the roof. For instance, each recording device 28 is preferably installed in a location spaced from the parapets 36, the vents 38, the roof access 40, the HVAC equipment 42, and conduits 44. It is believed that such placement reduces the degree to which such vertically projecting features interfere with sensing a hail storm event. However, one or more recording devices 28 could be positioned in contact with one or more projecting features (e.g., where the recording device 28 is located alongside a projecting feature or where the recording device 28 is attached above the projecting feature).

The multiple recording devices 28 are also preferably attached to the roof sections 24,26 so that the recording devices 28 are spaced apart from one another. However, for some aspects of the present invention, multiple ones of the recording devices 28 could be positioned immediately adjacent or in direct contact with one another (e.g., to cooperatively provide a continuous impact zone 49 with a continuous impact zone surface 50). Further, one or more sides of the panel component 46 could be attached to corresponding sides of one or more other panel assemblies to cooperatively form a hail sensing panel.

More preferably, at least some of the recording devices 28 are positioned in a uniform pattern. For instance, the illustrated roof assembly 20 has recording devices 28 arranged in the form of multiple rows R and columns C of recording devices 28. Adjacent rows R of recording devices 28 are preferably offset from one another along a direction parallel to the rows R. Similarly, adjacent columns C of recording devices 28 are preferably offset from one another along a direction parallel to the columns C. For some roof installations, the roof preferably has recording devices 28 attached adjacent to outermost corners 84 of the roof sections 24,26 (see FIG. 1).

Preferably, the recording devices 28 are provided so that the roof assembly 20 has a desired number (or density) of recording devices 28 associated with a given roof area. Preferably, for the illustrated recording device 28, with length and width dimensions of four (4) feet by four (4) feet, the roof has at least one recording device 28 for an associated roof area that ranges from about four hundred (400) square feet to about twenty thousand (20,000) square feet. It will be appreciated that the desired density of recording devices 28 can be affected by the roof configuration and the configuration of vertical roof projections. Furthermore, the presence of multiple buildings in a region with installed recording devices 28 could affect the desired density of recording devices 28 (e.g., where the desired density is reduced because one or more adjacent buildings have (or will have) a recording device 28 installed).

The illustrated recording devices 28 are attached to the roof as part of a new roof installation for the building 22. However, it will be appreciated that one or more of the recording devices 28 can be installed on an existing roof. The recording devices 28 could also be attached to the roof at different times. For instance, one or more previously installed recording devices 28 could be replaced with one or more new recording devices 28 (e.g., subsequent to a hail storm event).

In use, multiple recording devices 28 are preferably secured as part of the illustrated roof assembly 20, as described above. The recording devices 28 are used to record information about hail strikes substantially similar to hail strikes experienced by the roof from a hail storm event. Associated with the installation process, the identification indicia of each installed recording device 28 is preferably recorded in a manual or electronic database. Other information associated with each recording device 28 can also be recorded in the database, such as installation date, installer contact information (e.g., installer name, address, and phone number), and specification information for the recording device. Furthermore, to the extent that the recording device 28 includes processing and memory elements along with one or more electronic components as described above, additional information associated with each recording device 28 can be recorded in the database, such as identification information (e.g., model number, serial number, and/or specification information) associated with the processing, memory, and/or other electronic components. Yet further, initial ambient data associated with installation can also be recorded to the database, such as sensed load data, pressure data, video image data, still image data, wind velocity and direction data, and temperature data.

Again, the recording device 28 serves to record data associated with a hail storm event. For the illustrated panel component, the recorded data is in the form of one or more depressions (i.e., indentations) I caused by corresponding one or more hail strikes that plastically deform the panel component 46 along the impact zone surface 50. The depressions P each have properties associated with the impact energy of the corresponding hail strike. In particular, each depression P presents a maximum depth dimension Dd and a maximum width dimension Dw (see FIGS. 7 and 7a).

The dimensions Dd,Dw can be collected manually using conventional measurement tools. For instance, the depth dimension Dd can be measured with a conventional depth micrometer, and the width dimension Dw can be measured with a conventional ruler or micrometer. These manual measurements can then be recorded manually and/or electronically for later reference.

It is also within the ambit of the present invention where the dimensions Dd,Dw are measured and recorded using alternative devices such as electronic or automated measurement tools. For instance, an electronic scanner can collect one or more images of the indented impact zone surface 50 and record image data that can be used to digitally re-create the indented surface. In this manner, the dimensions Dd,Dw can be subsequently determined from the recorded image data.

For the illustrated recording device 28, the recorded data is generally collected subsequent to the hail storm event. Where the recording device collects and records data electronically in real time, data can also be collected during the hail storm event.

Where the indented panel component 46 is removed after the hail storm event due to excessive panel damage, the indented panel component 46 can be replaced with a new panel component 46. Alternatively, where the indented panel component 46 has only relatively shallow depressions, the panel component 46 could be reinstalled in an inverted position so that the lower sheet 56 faces upwardly.

Using the recorded dimension data from the recording device 28, an impact energy value can be calculated for a corresponding depression P. Specifically, the depth and width dimensions Dd,Dw for each depression P can be used to calculate the corresponding impact energy value of the hail stone S that formed the depression P. This is possible because the hail impact zone of the recording device 28 is preferably calibrated so that various degrees of deformation caused by hail strikes correspond with known values of impact energy. More specifically, the illustrated panel component has been calibrated so that the impact energy values identified in Table 1 produce depressions P with corresponding ranges of depth dimension Dd.

TABLE 1

Correlation of Impact Energy and Depth Dimension for a Panel Depression (hail stones with an outer diameter ranging from about 1.5 inches to about 2 inches)

| Impact Energy (foot-pounds) | Depression Depth (inches) |
|---|---|
| 0-2.5 | 0-0.080 |
| 5 | 0.114-0.132 |
| 10 | 0.180-0.190 |
| 12 | 0.190-0.210 |
| 15 | 0.210-0.290 |
| 20 | 0.340-0.400 |

Thus, for each measured depression depth dimension, a value of impact energy can be calculated from the chart in Table 1. It will also be appreciated that the correlation data in Table 1 can be used to calculate impact energy for a depth dimension Dd between an adjacent pair of listed depth dimensions Dd. This calculation can be done using conventional techniques, such as by using linear interpolation to determine the impact energy. Also, a nonlinear curve fit of the depression depth and impact energy data can be generated and used to determine the impact energy from the curve fit representation of the data.

As will be discussed, the correlation identified in Table 1 between depth dimension Dd and impact energy is developed empirically for the illustrated panel component 46 (or for other panel assemblies) so as to calibrate the panel for recording hail strikes.

In some instances, it might be possible to calculate, from the collected data including information about the depressions P, a mass and maximum diameter dimension of the associated hail stone S can be calculated from the recorded dimension data.

As mentioned above, the depressions P have depth and width dimensions Dd,Dw associated with the impact energy of the corresponding hail strike. This dimension data collected for all of the recorded depressions associated with one of the recording devices can be analyzed to calculate statistical information about the hail strikes. For instance, the dimension data can be analyzed to calculate mean (and/or median) depth and width dimensions for the depressions P, and the standard deviation of depth and width dimensions for the depressions P. The dimension data can also be used to calculate the maximum depth and width dimensions for depressions P.

Furthermore, the dimension data for multiple recording devices 28 can be analyzed collectively to calculate the statistical values mentioned above with respect to all of the multiple recording devices 28. Such calculations can be performed for multiple recording devices 28 installed on a single roof. Alternatively, these calculations can also be performed for multiple recording devices installed on multiple roofs (e.g., recording devices deployed across multiple, spaced apart buildings located on a single real estate property or on multiple properties).

Where the recording device 28 includes a video camera to record video data of the hail storm event recorded by the panel component 46, this video data can be evaluated and compared to the recorded data from the panel component 46. In particular, the recorded video data can be used to identify an individual hail stone S from the video data and where the hail stone S impacts the panel component. In this manner, the video data is used to associate the hail stone S with a particular depression P in the panel component 46.

With this association, the video data can be used to estimate the maximum diameter dimension of the hail stone S. The estimated maximum diameter dimension of the hail stone S can then be compared to the calculated maximum diameter dimension, e.g., to verify the accuracy of the dimension calculated from the recorded panel data.

Again, the correlation identified in Table 1 between depth dimension Dd and impact energy is developed empirically for the illustrated panel component 46 so as to calibrate the panel for recording hail strikes. Using a drop test similar to that disclosed in ASTM-D3746, a missile with a known weight is dropped onto a sample of the panel component 46 at various heights corresponding to the impact energy values listed in Table 1. The depth dimension of the depression associated with each missile drop is then measured, recorded, and associated with the respective impact energy value. However, calibration of the panel component 46 could be performed by other methods. For instance, various features of the panel component 46 could be specified and tested using a mathematical model and a theoretical determination of panel response to hail strikes. Furthermore, such a determination could be done using a computerized model and simulation of the panel (e.g., by performing a finite element analysis of the panel structural design).

Using the calculated energy values, as described above, it is typically desirable to test how a roof sample responds to the calculated energy values. This is particularly the case for hail strikes involving moderately-sized hail stones, when the full extent of any damage to the roof is hidden or is unclear from visual inspection. Moreover, with older roofs having damage caused simply by exposure, it may be difficult to determine whether the hail storm event is responsible for any of the damage.

This test would employ a standard drop test procedure, similar to that disclosed in ASTM-D3746. In particular, a missile with a known weight is dropped onto a roof sample at a height corresponding with a desired value of impact energy. The roof sample to be tested is preferably superimposed portions of the roof deck 30, substrate board 32, and roof membrane 34 taken from the roof assembly 20. Alternatively, the roof sample may be taken from the roof assembly 20 and include superimposed portions of only the substrate board 32 and roof membrane 34, or may only include a portion of the roof membrane 34 (although this is least desirable). Furthermore, the roof sample may include sample portions not taken from the roof assembly 20 but substantially identical to the respective roof deck 30, substrate board 32, and/or roof membrane 34. The drop test of the roof sample is preferably done remotely from the roof assembly 20, but could be performed on a sample that remains attached to the roof.

In most instances, the desired impact energy value for this test is the greatest value of impact energy calculated from the corresponding hail strikes. In other words, in conducting the drop test, the missile is set a height that produces the maximum impact energy as experienced by the device. The maximum energy should correspond with the depression(s) calibrated to the highest energy levels. It will be appreciated that the drop test may be performed one or more times at each desired height.

Subsequent to the drop test, the sample of the membrane 34 can then be visually inspected for visible structural damage, such as plastic deformation, cracking, and/or tearing of the sample roof membrane, substrate board, and/or roof deck.

Importantly, this drop test procedure can also be used to empirically determine a rating for a membrane, substrate board, roof deck, or other roofing material based upon the value of impact energy, associated with a hail strike, that the material sample can withstand without being damaged (e.g., without retaining damage in the form of plastic deformation, cracking, and/or tearing). For instance, the drop test can be performed at a series of impact energy values to determine the minimum value of impact energy required to generate a threshold level of damage that would trigger replacement of the roof. This information may, however, not be useful for aged roofs.

In at least some instances, it is desirable to use the recorded depression data from the panel component 46 and the corresponding values of calculated impact energy to assess, via the standard drop test procedure, whether significant damage is caused by such impact energy values to the roof membrane 34.

If necessary, in addition to the damage assessed during the testing of the roof sample, other factors can be used to assist in determining whether roof replacement is warranted. For example, the general age and condition of the roof membrane 34, damage to exposed vertical roof projections (such as vents, gutters, and HVAC equipment), and the number and/or density of structural damage occurrences to the roof may be used in this determination.

As discussed above, multiple recording devices 28 can be deployed across one or more buildings to sense a hail storm event. It is believed that deployment of multiple recording devices 28 across a wide area can potentially provide a better understanding of properties (such as the physical size, strength, path, speed, and timing) of a hail storm event.

In at least some instances, it is anticipated that recorded data from multiple recording devices 28 could be correlated with weather radar data to provide an even more detailed and complete history of the hail storm event. Various types of radar data could be compared and correlated with recorded data from the recording devices 28. For instance, dual polarimetric data could be correlated with the recorded data to interpolate and/or extrapolate properties of the hail storm event, such as hail size, impact energy, etc. at locations spaced from deployed recording devices 28 and/or at times different from times at which hail strikes are recorded by the recording devices 28. That is, hail storm properties could be interpolated and/or extrapolated as a function of location and/or time.

The correlation can be used to determine the maximum impact energy from hail and the frequency of large hail stones that could have occurred within a given area (e.g., a two (2) inch diameter hail stone having an impact energy of 20 ft-lb occurred about four (4) times in 100 square meters, with a 95% confidence level). It will be appreciated that interpolation and/or extrapolation of data can be performed using conventional mathematical curve fitting techniques, e.g., by using a Gaussian curve fit algorithm. Preferred dual polarimetric factors (or moments) for correlation with recorded data include, for instance, reflectivity, differential reflectivity, correlation coefficient, and specific differential phase.

Turning to FIGS. 8-13, alternative embodiments of the present invention are depicted. For the sake of brevity, the remaining description will focus primarily on the differences of these alternative embodiments from the first-mentioned embodiment described above.

Initially turning to FIG. 8, an alternative roof assembly 200 is constructed in accordance with a second embodiment of the present invention. The roof assembly 200 preferably includes an alternative roof section 202 and a hail strike recording device 204 substantially identical to the hail strike recording device 28.

The roof section 202 comprises part of a conventional pitched roof and includes a deck 206 and a plurality of composite shingles 208, with the deck 206 presenting an outwardly facing surface 210.

The recording device 204 includes a panel component 212 and a mounting assembly 214. The mounting assembly 214 includes a membrane 216 with an outermost margin 218 that is secured to the shingles 208 with a sealing layer (not shown). Thus, the mounting assembly 212 provides nonpenetrating attachment of the recording device 204 to the roof section 202. The panel component 212 includes a hail impact zone that presents an impact zone surface 220.

Each recording device 204 is preferably attached to the roof section 202 so that the impact zone surface 220 faces skyward in generally the same orientation as the outwardly facing surface 210 of the deck 206.

The impact zone surface 220 and the outwardly facing surface 210 present respective normal directions that preferably cooperatively define an included angle dimension ranging from about zero (0) degrees and to about ten (10) degrees and, more preferably, from about zero (0) degrees to about five (5) degrees. Most preferably, the surfaces 210,220 are both planar and are arranged in a substantially parallel relationship, with the included angle dimension being within the ranges discussed above or less.

Turning to FIGS. 9-10, an alternative roof assembly 300 is constructed in accordance with a third embodiment of the present invention. The roof assembly 300 preferably includes a roof section 302 and an alternative hail strike recording device 304.

The roof section 302 comprises a conventional flat roof construction and includes a roof deck 306, a substrate board 308, and a bitumen roof membrane 310. The roof deck 30 is preferably supported on a building framework (not shown).

The recording device 304 preferably includes a panel component 312 and an alternative mounting assembly 314 that secures the panel component 312 to the roof. The panel component 312 includes a panel core 316 and opposite upper and lower sheets 318,320 fixed to corresponding faces of the panel core 316.

The mounting assembly 314 is preferably used to position the panel component 312 in a position spaced above the roof membrane 310. The illustrated mounting assembly 314 includes a pair of elongated wood studs 322, a membrane 324, fastener assemblies 326, and nails 328. The wood studs 322 comprise conventional 2×4 studs with multiple counterbored holes 330 spaced along the length of the stud 322. The studs 322 are preferably spaced apart and aligned substantially parallel to one another and to opposite outer margins of the panel component 312. The studs 322 are each preferably nailed to the underlying roof section 302 with multiple nails 328. However, the studs 322 could be secured to the roof using alternative fasteners.

The membrane 324 is preferably laid over the studs 322 and sealed to the roof membrane 310 using a sealing layer (not shown) of hot-mop bitumen or adhesive.

The panel component 312 is preferably removably secured to the studs 322 with multiple ones of the fastener assemblies 326. Each fastener assembly 326 is conventional and preferably includes a threaded bolt 326a, threaded nut 326b, and washer 326c.

Again, when the panel component 312 is attached to the roof, the panel component 312 is spaced above the roof membrane 310. Thus, the recording device 304 and the roof cooperatively define an open space 332 that permits exposed conduit 334 to extend below the panel component 312. It is also within the ambit of the present invention where the recording device 304 is configured to be mounted to the roof so that other types of exposed structures could be located adjacent and/or below the panel component 312. Nevertheless, the illustrated mounting assembly 314 serves to position the panel component 312 adjacent the roof, as described above.

Turning to FIGS. 11-13, an alternative roof assembly 400 is constructed in accordance with a fourth embodiment of the present invention. The roof assembly 400 preferably includes a roof section 402 and an alternative hail strike recording device 404.

The recording device 404 preferably includes an alternative panel component 406 and alternative mounting assembly 408 that supports the panel component 406 on the roof. In this embodiment, the panel component preferably comprises a platen 412. The recording device 404 further includes components for electronically recording data about hail strikes.

More particularly, the device 404 preferably includes multiple load cells 414, and a controller 416 including a processor 418 and a memory element 420.

The preferred mounting assembly 408 includes a frame 421 that comprises a base plate 422 and a rim 424. The rim 424 preferably extends endlessly along an outer margin of the base plate 422 so as to cooperatively present a chamber 426. The chamber 426 preferably presents a generally square profile shape. The base plate 422 and rim 424 are preferably formed of aluminum, but could include alternative materials.

The platen 412 is used to sense hail strikes during a hail storm event. The platen 412 preferably comprises a unitary metal plate that presents a substantially continuous plate thickness and a generally square profile shape. The platen 412 is preferably substantially rigid so that the platen 412 does not experience plastic deformation in response to a hail strike. The platen 412 also presents an exposed face comprising an impact zone surface 428 that faces skyward and is operable to be impacted by a hail stone.

Each recording device 404 is preferably attached to the roof so that the impact zone surface 428 faces skyward in generally the same orientation as an exposed surface of the roof membrane. Most preferably, the impact zone surface 428 and the exposed surface of the roof are both planar and are arranged in a substantially parallel relationship, with the included angle dimension being within the ranges discussed in connection with the first-mentioned panel embodiment.

When placed in the chamber 426, the platen 412 provides an impact zone that extends across the entire face of the platen 412, with the impact zone being operably connected to and supported by the load cells 414. The platen 412 is preferably spaced from the rim 424 to prevent the platen 412 from being directly contacted or supported by the frame 421. Therefore, the frame 421 avoids interfering with the load cells 414 sensing the entire force applied to the platen 412 by a hail strike. In other words, the platen 412 is directly supported exclusively by the load cells 414.

However, for some aspects of the present invention, the platen 412 could be attached along the outer margin thereof to the frame 421 (e.g., where the outer margin of the platen 412 is attached continuously or periodically along the uppermost margin of the rim 424).

The load cells 414 are conventional transducers that each provide output data in the form of an electronic signal that corresponds to a sensed force. In particular, each load cell 414 senses a force applied to the load cell 414 along an axial direction. The load cells 414 are attached to an interior or bottom surface of the base plate 422. In the illustrated embodiment, the axial direction of each load cell 414 is substantially parallel to the direction normal to the impact zone surface 428. Further, the load cells 414 are positioned adjacent to respective corners of the frame 421 and support the platen 412 adjacent to respective corners thereof. In this manner, the load cells 414 are used to cooperatively sense any force applied to the platen 412 along a direction normal to the impact zone surface 428.

While the load cells 414 are preferred to sense hail strikes on the platen 412, it is within the ambit of the present invention where an alternative transducer, such as a velocity sensor or an accelerometer, is used to sense such hail strikes. It will be appreciated that alternative transducers could be used to sense one or more alternative parameters (such as displacement, velocity, acceleration, vibration amplitude, vibration frequency, deflection, etc.) associated with hail strikes of the platen.

The processor 418 and memory element 420 are conventional. The processor 418 may include microprocessors, microcontrollers, digital signal processors (DSPs), field-programmable gate arrays (FPGAs), analog and/or digital application-specific integrated circuits (ASICs), and the like, or combinations thereof. The processor 418 may generally execute, process, or run instructions, code, software, firmware, programs, applications, apps, or the like, or may step through states of a finite-state machine.

The memory element 420 may include data storage components such as read-only memory (ROM), random-access memory (RAM), hard-disk drives, optical disk drives, flash memory drives, and the like, or combinations thereof. The memory element 420 may include, or may constitute, a "computer-readable medium". The memory element 420 may store the instructions, code, software, firmware, programs, applications, apps, or the like that are executed by the processor. The memory element 420 may also store settings or data.

In the usual manner, the processor 418 and memory element 420 are operably coupled to each other. The processor 418 is also operably coupled to the load cells 414 so that the processor 418 can be programmed or otherwise operated to selectively sample output data from each of the load cells 414. The processor 418 is operably coupled to the memory element 420 to store the output data as recorded data in the memory element 420. Yet further, the processor 418 is operable to be coupled to an external device (not shown) so that recorded data and/or output data from the load cells 414 can be transmitted to the external device. The external device can include, but is not limited to, another processor, another memory element, or a combination thereof. Additionally, as will be discussed, the controller 416 can be operably coupled to the controller 416 of one or more other recording devices 404, a server, a database, or other communication, storage, or processing devices.

Preferably, the processor 418 samples output data from the load cells 414 at a sampling rate that ranges from about one hundred twenty Hertz (120 Hz) to about one thousand Hertz (1000 Hz). It has been determined that this range of sampling rate is particularly effective for accurately sampling the output data caused by multiple hail strikes.

The recording device 404 also preferably includes a camera 430 (preferably in the form of a video camera, although a still image camera is within the scope of the present invention), a wind anemometer 432, a wind direction sensor 434, and a temperature sensor 436 (see FIG. 13). These components are conventional and are each operably coupled to the processor 418 so that the processor 418 can selectively sample and record output data from each device.

Again, the controller 416 can be operably coupled to the controller 416 of one or more other recording devices 404, a server, or other communication, storage, or processing devices. The recording device 404 may also include a computing device or be operably coupled to a server device or another computing device that provides access to one or more general computing resources, such as Internet services, electronic mail services, data transfer services, and the like. The recording device 404 may also provide or be operably coupled to another device (such as a server or computing device) that provides access to a database that stores information and data necessary for the implementation of embodiments of the present invention.

The recording device 404 may include a computing device or be operably coupled to a server device and/or another computing device that comprises mobile communication devices (including wireless devices), work stations, desktop computers, laptop computers, palmtop computers, tablet computers, portable digital assistants (PDA), smart phones, and the like, or combinations thereof. Various embodiments of such computing devices may also include voice communication devices, such as cell phones or landline phones. In preferred embodiments, such computing devices may have an electronic display, such as a cathode ray tube, liquid crystal display, plasma, or touch screen that is operable to display visual graphics, images, text, etc. In certain embodiments, the present invention may facilitate interaction and communication through a graphical user interface (GUI) that is displayed via the electronic display. The GUI enables the user to interact with the electronic display by touching or pointing at display areas to provide information to a user control interface, discussed in more detail below. Such computing devices may be able to capture, store, and transmit digital images, videos, and other data.

The computing devices described above may include a user control interface that enables one or more users to share information and commands with computing devices and/or server devices. The user interface may facilitate interaction through the GUI described above or may additionally comprise one or more functionable inputs such as buttons, keyboard, switches, scrolls wheels, voice recognition elements such as a microphone, pointing devices such as mice, touchpads, tracking balls, styluses. The user control interface may also include a speaker for providing audible instructions and feedback. Further, the user control interface may comprise wired or wireless data transfer elements, such as a communication component, removable memory, data transceivers, and/or transmitters, to enable the user and/or other computing devices to remotely interface with the recording device 404.

With the illustrated recording device 404, a communications network may be provided and/or used in the form of a wired or wireless network and may include servers, routers, switches, wireless receivers and transmitters, and the like, as well as electrically conductive cables or optical cables. The communications network may also include local, metro, or wide area networks, as well as the Internet, or other cloud networks. Furthermore, the communications network may include cellular or mobile phone networks, as well as landline phone networks, public switched telephone networks, fiber optic networks, or the like.

Recording devices 404, server devices, and other computing devices may be connected to the communications network. Recording devices 404 may communicate with server devices or other computing devices through the communications network. Server devices may communicate with other server devices, recording devices 404, or other computing devices through the communications network. Also, other computing devices may communicate with recording devices 404 or server devices through the communications network. The connection to the communications network may be wired or wireless. Thus, the recording devices 404, server devices, and other computing devices may include the appropriate components to establish a wired or a wireless connection.

With respect to the electronic components of the illustrated recording device 404, it will be appreciated that these components, and the associated methods for using them, could also be used in combination with the panels described in the previous embodiments.

The mounting assembly 408 also preferably includes vibration isolation mounts 438 and fasteners 440. The vibration isolation mounts 438 each preferably comprise unitary elastomeric mounting pads (such as rubber pads). However, the vibration isolation mounts 438 could be alternatively configured within the scope of the present invention. Fasteners 440 engage and secure the frame 421 to the roof. With the frame 421 attached to the roof, the vibration isolation mounts 438 are preferably positioned between the base plate 422 and the roof.

In use, the recording devices 404 are mounted on the roof and include the frame 421, platen, 412, load cells 414, and controller 416, as mentioned above. The recording devices 404 are positioned so that the platen face faces skyward in generally the same orientation as the roof, with hail strikes against the platen face being substantially similar to hail strikes against the roof. The load cells 414 are operably coupled to the platen 412 to sense force associated with a hail strike. The controller 416 is coupled to the load cells so that the processor 418 receives (or samples) force output signals from the load cells 414 associated with sensed forces and stores the force output signals as recorded output data in the memory element 420.

The processor 418 samples output signals from the load cells 414 at a sampling rate that ranges from about one hundred twenty Hertz (120 Hz) to about one thousand Hertz (1000 Hz). Again, it has been determined that this range of sampling rate is particularly effective for accurately sampling the output data caused by multiple hail strikes.

The processor 418 also receives signals from the camera 430, the wind anemometer 432, the wind direction sensor 434, and the temperature sensor 436. Furthermore, the processor 418 stores these output signals as recorded output data in the memory element 420.

The recorded output data is selectively collected from the controller 416 by operably connecting an external device (such as one of the external devices described above) to the controller 416 and transmitting the recorded output data to the external device.

The transmitted output data can then be used to analyze the sensed hail strikes. For instance, the recorded force output signals can be used to calculate corresponding values of impact energy. As discussed above in the first-mentioned embodiment, the calculated impact energy values can be used to test a sample of the roof to assess whether the impact energy causes damage to the roof sample (e.g., whether any damage is sufficient to justify replacement of the roof).

Using a drop test similar to that disclosed in ASTM-D3746, the recording device 404 is preferably calibrated to produce a chart that compares a sensed maximum impact force for a test missile and the impact energy associated with the dropped missile. This calibration is preferably done prior to installation of the recording device 404 on the roof, but could also be done after installation (e.g., to determine if the calibration of load cells 414 or other components of the recording device 404 has changed, or if components of the recording device 404 have otherwise failed, since installation).

Again, a missile with a known weight can be dropped onto the panel at various heights corresponding to particular impact energy values, such as those listed in Table 1. Output data from the load cells 414 associated with sensed values of force can be sampled by the processor and stored as recorded output data. This recorded data can then be correlated to the corresponding values of impact energy and missile drop height for each missile drop.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A hail strike recording device operable to provide quantifiable information about a hail storm event experienced by a roof, said recording device comprising:
a sacrificial panel component including a deformable hail impact zone,
said impact zone being calibrated so that deformation caused by a hail strike corresponds with a known impact energy; and
a mounting assembly configured to support the panel component on the roof,
said mounting assembly being fixedly coupled to the panel component and including an anchor operable to be secured to the roof,
said mounting assembly being configured to support the panel component adjacent the roof so that the hail impact zone faces skyward in generally the same orientation as the roof, such that the impact energy absorbed by the impact zone is substantially similar to that which would have been experienced by the roof if the hail had struck the roof rather than the panel component.

2. The hail strike recording device as claimed in claim 1,
said impact zone being configured so that deformation caused by the hail strike creates a dimensionally measurable depression, with the dimensions of the depression corresponding with the known impact energy.

3. The hail strike recording device as claimed in claim 1,
said panel component being configured so that the hail impact zone is capable of supporting a static force of at least about 50 psi without plastically deforming.

4. The hail strike recording device as claimed in claim 3,
said panel component being configured so that the hail impact zone is capable of supporting a static force of less than about 75 psi without plastically deforming.

5. The hail strike recording device as claimed in claim 1,
said panel component including an upper sheet and a panel core that underlies the upper sheet, with the upper sheet and panel core being deformable as a result of hail strikes against the upper sheet.

6. The hail strike recording device as claimed in claim 5,
said panel component including a lower sheet opposite the upper sheet, such that the panel core is interposed between the upper and lower sheets.

7. The hail strike recording device as claimed in claim 6,
said sheets being planar and at least substantially parallel to one another.

8. The hail strike recording device as claimed in claim 7,
said panel core presenting opposite core faces,
each of said sheets being fixed directly to a corresponding one of the core faces.

9. The hail strike recording device as claimed in claim 8,
said panel core including a plurality of fins that extend normally between the sheets.

10. The hail strike recording device as claimed in claim 9,
said fins being interconnected to define a honeycomb or honeycomb-like pattern.

11. The hail strike recording device as claimed in claim 10,
said panel component presenting a component thickness that ranges from about ½ inch to about 2 inches,
said sheets each presenting a sheet thickness that ranges from about 0.01 inch to about 0.05 inch.

12. The hail strike recording device as claimed in claim 10,
said panel core and sheets being formed of Aluminum.

13. The hail strike recording device as claimed in claim 5,
said panel core presenting exposed core sides defined below the upper sheet,
said mounting assembly covering the core sides.

14. The hail strike recording device as claimed in claim 5,
said panel component presenting a component thickness that ranges from about ½ inch to about 2 inches,
said upper sheet presenting a sheet thickness that ranges from about 0.01 inch to about 0.05 inch.

15. The hail strike recording device as claimed in claim 1,
said panel component including an attachment section to which the mounting assembly is attached.

16. The hail strike recording device as claimed in claim 15,
said attachment section extending around the hail impact zone.

17. The hail strike recording device as claimed in claim 16,
said mounting assembly including an elongated mounting bracket that extends along and is interconnected with the panel component,
said mounting assembly including an attachment membrane secured to the mounting bracket,
said attachment membrane being connectable to the roof.

18. The hail strike recording device as claimed in claim 17,
said attachment membrane being in sealing contact with the panel component along the attachment section.

19. The hail strike recording device as claimed in claim 18,
said attachment membrane being endless and circumscribing the panel component.

20. The hail strike recording device as claimed in claim 19,
said attachment membrane comprising a roof material that is operable to be joined with an exposed roof membrane.

21. The hail strike recording device as claimed in claim 20,
said mounting assembly including an applied sealing layer configured to interconnect the attachment member and the roof membrane.

22. The hail strike recording device as claimed in claim 21,
said sealing layer including a bitumen material.

23. The hail strike recording device as claimed in claim 21,
said attachment membrane and sealing layer being securable to the roof without the use of mechanical fasteners.

24. A roof assembly for a building structure, said roof assembly comprising:
a roof exposed to hail storm events; and
a hail strike recording device operable to provide quantifiable information about a hail storm event experienced by the roof, said recording device including—
a sacrificial panel component including a deformable hail impact zone,
said impact zone being calibrated so that deformation caused by a hail strike corresponds with a known impact energy, and
a mounting assembly supporting the panel component adjacent the roof so that the hail impact zone faces skyward in generally the same orientation as the roof, such that the impact energy absorbed by the impact zone is substantially similar to that which would have been experienced by the roof if the hail had struck the roof rather than the panel component.

25. The roof assembly as claimed in claim 24,
said impact zone being configured so that deformation caused by the hail strike creates a dimensionally measurable depression, with the dimensions of the depression corresponding with the known impact energy.

26. The roof assembly as claimed in claim 24,
said panel component being configured so that the hail impact zone is capable of supporting a static force of at least about 50 psi without plastically deforming.

27. The roof assembly as claimed in claim 26,
said panel component being configured so that the hail impact zone is capable of supporting a static force of less than about 75 psi without plastically deforming.

28. The roof assembly as claimed in claim 24,
said panel component including an upper sheet and a panel core that underlies the upper sheet, with the upper sheet and panel core being deformable as a result of hail strikes against the upper sheet.

29. The roof assembly as claimed in claim 28,
said panel component including a lower sheet opposite the upper sheet, such that the panel core is interposed between the upper and lower sheets.

30. The roof assembly as claimed in claim 29,
said sheets being planar and at least substantially parallel to one another.

31. The roof assembly as claimed in claim 30,
said panel core presenting opposite core faces,
each of said sheets being fixed directly to a corresponding one of the core faces.

32. The roof assembly as claimed in claim 31,
said panel core including a plurality of fins that extend normally between the sheets.

33. The roof assembly as claimed in claim 32,
said fins being interconnected to define a honeycomb or honeycomb-like pattern.

34. The roof assembly as claimed in claim 33,
said panel component presenting a component thickness that ranges from about ½ inch to about 2 inches,
said sheets each presenting a sheet thickness that ranges from about 0.01 inch to about 0.05 inch.

35. The roof assembly as claimed in claim 33,
said panel core and sheets being formed of Aluminum.

36. The roof assembly as claimed in claim 28,
said panel core presenting exposed core sides defined below the upper sheet,
said mounting assembly covering the core sides.

37. The roof assembly as claimed in claim 28,
said panel component presenting a component thickness that ranges from about ½ inch to about 2 inches,
said upper sheet presenting a sheet thickness that ranges from about 0.01 inch to about 0.05 inch.

38. The roof assembly as claimed in claim 24,
said panel component including an attachment section to which the mounting assembly is attached.

39. The roof assembly as claimed in claim 38,
said attachment section extending around the hail impact zone.

40. The roof assembly as claimed in claim 39,
said mounting assembly including an elongated mounting bracket that extends along and is interconnected with the panel component,
said mounting assembly including an attachment membrane secured to the mounting bracket,
said attachment membrane being connected to the roof.

41. The roof assembly as claimed in claim 40,
said attachment membrane being in sealing contact with the panel component along the attachment section.

42. The roof assembly as claimed in claim 41,
said attachment membrane being endless and circumscribing the panel component.

43. The roof assembly as claimed in claim 42,
said roof presenting an exposed roof membrane,
said attachment membrane comprising a roof material that is joined with the roof membrane.

44. The roof assembly as claimed in claim 43,
said mounting assembly including an applied sealing layer interconnecting the attachment member and the roof membrane.

45. The roof assembly as claimed in claim 44,
said roof membrane and sealing layer each including a bitumen material.

46. The roof assembly as claimed in claim 44,
said attachment membrane and sealing layer being secured to the roof without the use of mechanical fasteners.

47. A roof assembly for a building structure, said roof assembly comprising:
a roof exposed to hail storm events; and
an electronic hail strike recording device operable to provide data about a hail storm event experienced by the roof, said recording device including—
a platen presenting an upwardly directed platen face operable to be impacted by hail,
an electronic sensor operably coupled to the platen to sense a platen parameter associated with a hail strike,
said sensor providing output signals corresponding to the sensed platen parameter,
a processing unit operably coupled to the sensor to receive and store the output signals from the sensor, and
a mounting assembly supporting the platen adjacent the roof so that the platen face faces skyward in generally the same orientation as the roof, such that hail strikes against the platen face are substantially similar to hail strikes against the roof.

48. The roof assembly as claimed in claim 47,
said mounting assembly including a protective frame that is configured to be secured to the roof.

49. The roof assembly as claimed in claim 48,
said frame including a lower base and a rim that projects upwardly from the base,
said rim presenting an upwardly open frame chamber in which the platen is received.

50. The roof assembly as claimed in claim 49,
said electronic sensor exclusively supporting the platen on the frame.

51. The roof assembly as claimed in claim 50,
said rim extending at least substantially continuously about the platen.

52. The roof assembly as claimed in claim 51,
said platen being spaced entirely from the frame.

53. The roof assembly as claimed in claim 50,
said sensor being supported on the base of the frame,
said mounting assembly including vibration isolation mounts between the base and roof.

54. The roof assembly as claimed in claim 53,
said mounting assembly including a plurality of fasteners interconnecting the frame and roof.

55. The roof assembly as claimed in claim 53,
said processing unit being supported on the base of the frame.

56. The roof assembly as claimed in claim 49,
said sensor comprising a load sensor, such that the platen parameter comprises loads on the platen caused by hail strikes.

57. The roof assembly as claimed in claim 49,
said platen being entirely spaced from the frame.

58. The roof assembly as claimed in claim 47,
said platen being directly supported by and contacting only the electronic sensor.

59. The roof assembly as claimed in claim 58,
said sensor comprising a load sensor, such that the platen parameter comprises loads on the platen caused by hail strikes.

60. The roof assembly as claimed in claim 47,
said processing unit being operable to sample signals the sensor at a sampling rate that ranges from about 120 Hz to about 1000 Hz.

61. The roof assembly as claimed in claim 47,
said recording device including a wind sensor operable to sense wind speed and wind direction adjacent the platen and provide corresponding wind speed and wind direction signals,
said processing unit being operably coupled to the wind sensor to receive and store the wind speed and wind direction signals from the wind sensor.

62. The roof assembly as claimed in claim 47,
said recording device including a digital camera operable to take images of the platen face and provide corresponding image signals,
said processing unit being operably coupled to the camera to receive and store the image signals from the camera.

63. A method of assessing the affect of a hail storm event experienced by the roof of a building structure, said method comprising the steps of:
(a) having information recorded about hail strikes substantially similar to those experienced by the roof;
(b) determining the impact energy that corresponds with at least one of the hail strikes; and
(c) applying the impact energy determined in step (b) against a sample of the roof,
step (a) including the step of positioning a hail strike recording device in an overlying relationship with a portion of the roof.

64. The method as claimed in claim 63,
step (a) including the step of mounting a sacrificial panel component on the roof, wherein the panel component includes a deformable hail impact zone calibrated so that deformation caused by a hail strike corresponds with a known impact energy, such that the impact zone faces skyward in generally the same orientation as the roof, with the impact energy absorbed by the impact zone being substantially similar to that which would have been experienced by the roof if the hail had struck the roof rather than the panel component.

65. The method as claimed in claim 64,
step (b) including the step of measuring the dimension of the deformation and correlating the dimension to a known impact energy.

66. The method as claimed in claim 65,
step (b) including the step of removing the panel component from the roof.

67. The method as claimed in claim 66; and
(d) replacing the deformed panel component with a new panel component.

68. The method as claimed in claim 63,
step (a) including the step of mounting a platen and an electronic sensor on the roof, wherein the sensor is operably coupled to the platen to sense a platen parameter associated with a hail strike, and the sensor provides output signals corresponding to the sensed platen parameter, such that a platen face faces skyward in generally the same orientation as the roof, with hail strikes against the platen face being substantially similar to hail strikes against the roof.

69. The method as claimed in claim 68,
step (a) including the steps of receiving and storing the output signals from the sensor,
step (b) including the step of analyzing the stored output signals.

70. The method as claimed in claim 69,
step (a) including the step of sampling the output signals from the sensor at a sampling rate that ranges from about 120 Hz to about 1000 Hz.

71. The method as claimed in claim 63,
step (b) including the step of identifying the greatest impact energy associated with the hail strikes,
step (c) including the step of applying the greatest impact energy against the roof sample.

72. The method as claimed in claim 63; and
(d) removing a section of the roof to provide the sample.

73. The method as claimed in claim 72,
step (d) including the step of removing superimposed portions of the outer layer and roof deck of the roof so that the sample includes both.

74. The method as claimed in claim 72,
step (c) being performed remotely from the roof.

75. The method as claimed in claim 32,
step (b) including the step of comparing the recorded information to predetermined information values, each of which corresponds with a known impact energy.

76. The method as claimed in claim 63; and
(d) assessing the damage caused by the impact energy applied in step (c).

77. The method as claimed in claim 76; and
step (d) including the step of determining whether the assessed damage justifies roof replacement.

78. The method as claimed in claim 77,
step (d) including the step of identifying damage in the form plastic deformation of the roof sample, tears in the roof sample, and cracks in the roof sample.

79. The method as claimed in claim 63; and
(d) comparing the recorded information with real time weather data corresponding to the hail storm event.

* * * * *